United States Patent
Cheng

(10) Patent No.: US 10,241,871 B1
(45) Date of Patent: Mar. 26, 2019

(54) FRAGMENTATION MITIGATION IN SYNTHETIC FULL BACKUPS

(71) Applicant: Veritas TEchnologies LLC, Mountain View, CA (US)

(72) Inventor: Shuai Cheng, Beijing (CN)

(73) Assignee: Veritas Technologies LLC, Mountain View, CA (US)

(*) Notice: Subject to any disclaimer, the term of this patent is extended or adjusted under 35 U.S.C. 154(b) by 432 days.

(21) Appl. No.: 14/674,015

(22) Filed: Mar. 31, 2015

(51) Int. Cl.
   *G06F 17/30* (2006.01)
   *G06F 11/14* (2006.01)

(52) U.S. Cl.
   CPC ................. *G06F 11/1453* (2013.01)

(58) Field of Classification Search
   CPC ......... G06F 17/30156; G06F 17/30215; G06F 11/1469; G06F 2009/45583; G06F 9/45558; G06F 17/30073; G06F 17/30194; G06F 17/30233; G06F 17/30507; G06F 17/30575; G06F 17/30997; G06F 17/3012; G06F 17/30321; G06F 17/30339; G06F 11/1453; G06F 17/30371; G06F 3/0608; G06F 11/1448; G06F 11/1451; G06F 11/1435
   USPC ........................................................ 707/654
   See application file for complete search history.

(56) References Cited

U.S. PATENT DOCUMENTS

| | | | | |
|---|---|---|---|---|
| 2004/0111448 A1* | 6/2004 | Garthwaite | ......... | G06F 12/0276 |
| 2008/0016131 A1* | 1/2008 | Sandorfi | ............. | G06F 11/1458 |
| 2011/0029972 A1* | 2/2011 | Wade | .................. | G06F 9/45558 718/1 |
| 2014/0181294 A1* | 6/2014 | Deshpande | ......... | G06F 9/45533 709/224 |
| 2014/0201162 A1* | 7/2014 | Kumarasamy | ...... | G06F 11/1469 707/679 |
| 2014/0201737 A1* | 7/2014 | Mitkar | .................... | G06F 9/461 718/1 |
| 2015/0006846 A1* | 1/2015 | Youngworth | ......... | G06F 3/0689 711/216 |
| 2015/0095596 A1* | 4/2015 | Yang | ....................... | G06F 3/061 711/162 |
| 2016/0019317 A1* | 1/2016 | Pawar | ................. | G06F 17/3007 707/649 |
| 2016/0132400 A1* | 5/2016 | Pawar | ................. | G06F 11/1458 707/679 |
| 2016/0147606 A1* | 5/2016 | Arroyo | ............... | G06F 11/2247 714/5.11 |

* cited by examiner

*Primary Examiner* — Evan Aspinwall
(74) *Attorney, Agent, or Firm* — Campbell Stephenson LLP

(57) ABSTRACT

Various methods, systems, and processes for mitigating fragmentation in synthetic full backups are disclosed. One or more storage units out of multiple storage units are identified. The multiple storage units include one or more new storage units or one or more existing storage units. The multiple storage units are accessed and a determination is made as to whether the one or more storage units out of the multiple storage units meet a threshold. The threshold is a measure of a characteristic of those one or more storage units. If one or more storage units meet the threshold, those one or more storage units are included in a backup stream, and the backup stream is sent to a backup server.

20 Claims, 17 Drawing Sheets

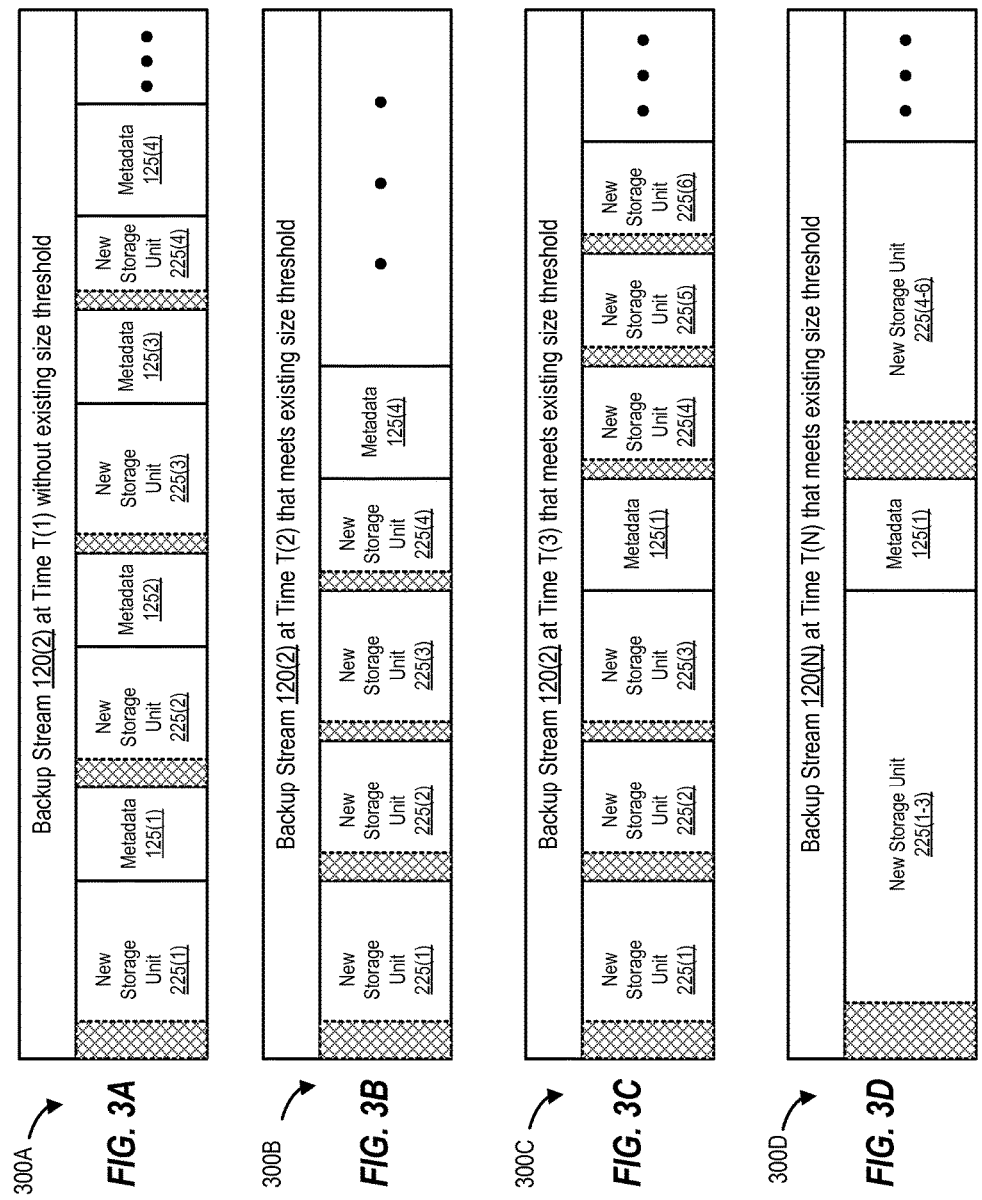

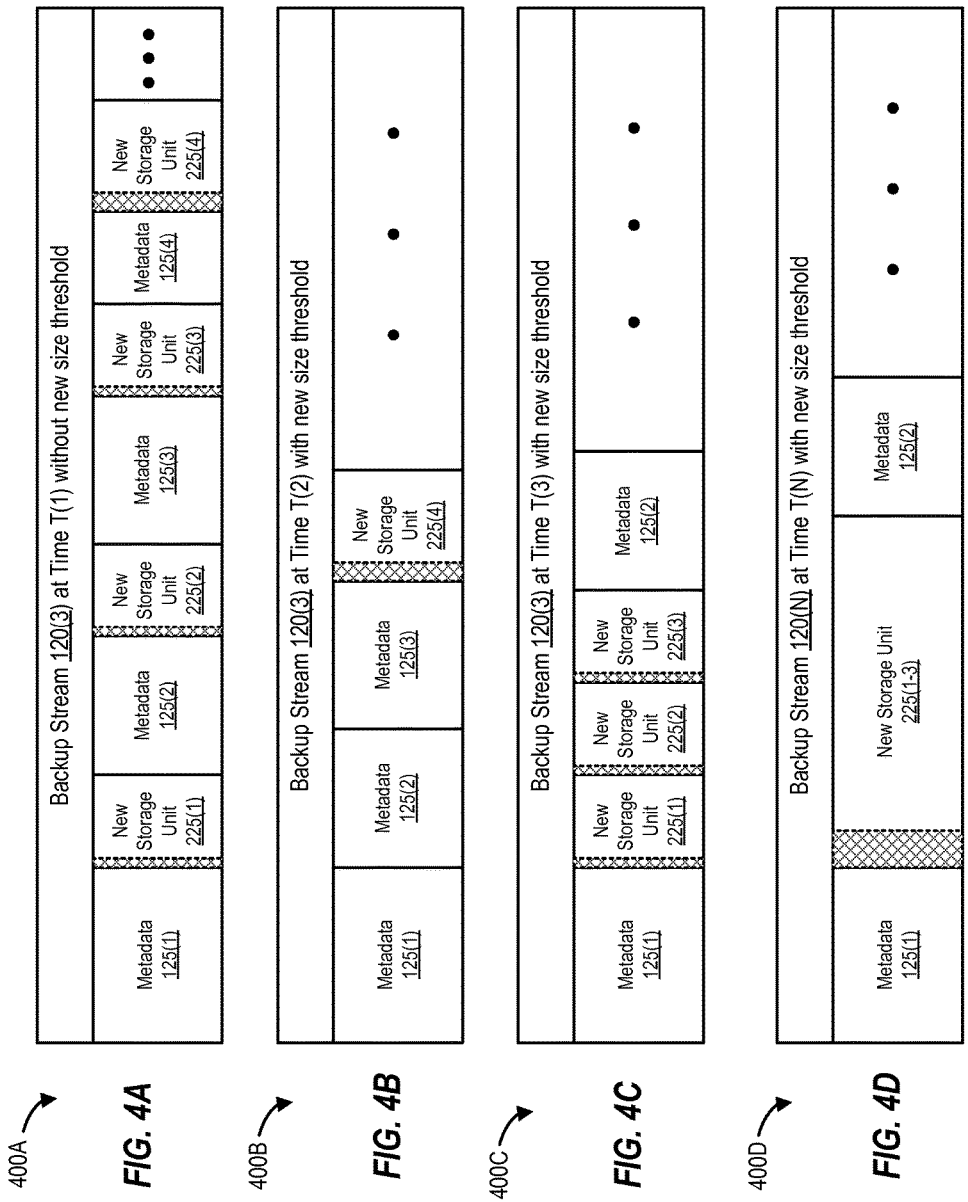

FRAGMENTATION MITIGATION IN SYNTHETIC FULL BACKUPS

FIELD OF THE DISCLOSURE

This disclosure relates to data backup operations and, more particularly, to mitigating fragmentation in synthetic full backups.

DESCRIPTION OF THE RELATED ART

Generally, backup operations may be full or incremental. A full backup operation produces a full backup set or a copy of all data—data that has changed as well as data that is unchanged. An incremental backup operation produces an incremental backup set or a copy of only data that has changed (e.g., since a prior full or incremental backup operation).

Some backup systems offer another option. For example, a synthetic full backup operation consolidates a baseline full backup set and several incremental backup sets into a new full backup set. The new full backup set can then be used for further incremental backup operations. Generally, a new full backup of a given data set is preferable to definitively protect the data set in question.

Because a synthetic full backup restoration process can produce a full backup from incremental backups, such an approach minimizes the resource requirements related to the incremental backups. However, because a synthetic full backup produces a new full backup by piecing together a full backup from parts of the last full backup and intervening incremental backups, performing a synthetic full backup operation can be time and resource intensive.

SUMMARY OF THE DISCLOSURE

Various systems, methods, and processes for mitigating fragmentation in synthetic full backups are disclosed. One such method involves identifying one or more storage units out of multiple storage units. The multiple storage units include one or more new storage units or one or more existing storage units. The method accesses the multiple storage units and determines whether the one or more storage units out of the multiple storage units meet a threshold. In this example, the threshold is a measure of a characteristic of those one or more storage units. If one or more storage units meet the threshold, the method includes those one or more storage units in a backup stream, and sends the backup stream to a backup server.

In some embodiments, the method obtains one or more storage units from a client (e.g., a virtual machine). The method identifies the one or more storage units obtained from the client using a change tracking log. In other embodiments, the method determines whether one or more new storage units meet a new size threshold and includes those one or more new storage units that meet the new size threshold in the backup stream. Similarly, the method also determines whether one or more existing storage units meet an existing size threshold and includes those one or more existing storage units that meet the existing size threshold in the backup stream.

In one embodiment, the method waits for the client to generate additional new data prior to including one or more existing storage units in the backup stream if those one or more existing storage units do not meet the existing size threshold. In another embodiment, the method waits for the client to generate additional data prior to including one or more new storage units in the backup stream if those one or more new storage units do not meet the new size threshold.

In some embodiments, the method determines whether a span of storage units includes more new storage units than existing storage units and includes the span of storage units in the backup stream if the span of storage units includes more new storage units than existing storage units. In this example, the method includes the span of storage units in the backup stream even if one or more storage units do not meet the threshold as long as the span of storage units includes more new storage units than existing storage units.

In other embodiments, the method limits a frequency with which one or more existing units of storage are included in the backup stream if multiple storage units (e.g., a span of storage units) include more existing storage units than new storage units.

In one embodiment, the method determines the threshold based on whether including one or more storage units in the backup stream if those one or more storage units do not meet the threshold will cause fragmentation if the backup stream is stored by the backup server at a storage location.

In another embodiment, the method merges two or more new storage units if those two or more new units of storage do not meet the new size threshold and includes the merged two or more new storage units in the backup stream.

The foregoing is a summary and thus contains, by necessity, simplifications, generalizations, and omissions of detail; consequently those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE DRAWINGS

FIGS. 3A-3D are simplified block diagrams that illustrate backup streams, according to one embodiment.

FIGS. 4A-4D are also simplified block diagrams that illustrate backup streams, according to one embodiment.

Figure 1A:
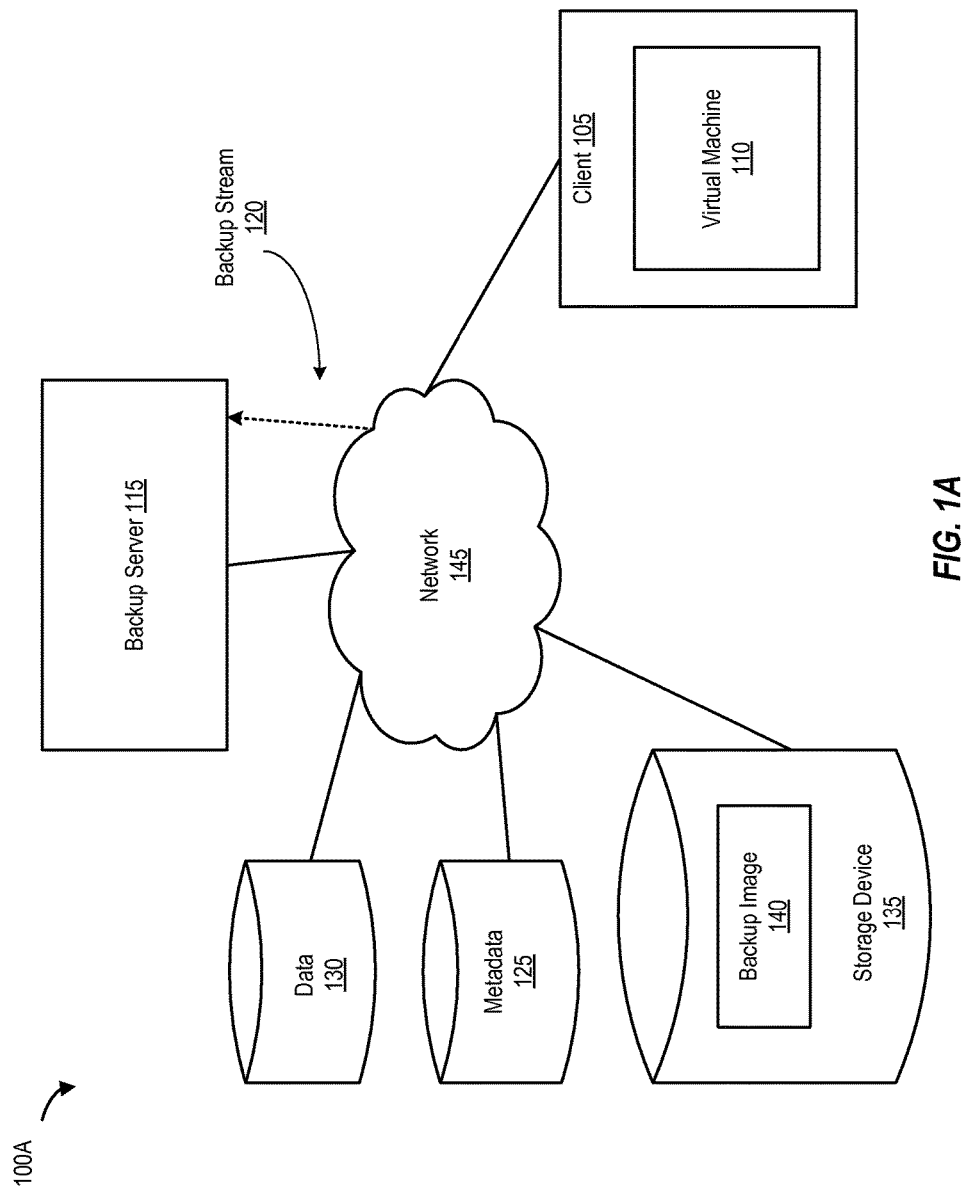
FIG. 1A is a simplified block diagram that of computing system that selects storage units for inclusion in a backup stream, according to one embodiment.

While the disclosure is susceptible to various modifications and alternative forms, specific embodiments of the disclosure are provided as examples in the drawings and detailed description. It should be understood that the drawings and detailed description are not intended to limit the disclosure to the particular form disclosed. Instead, the intention is to cover all modifications, equivalents, and alternatives falling within the spirit and scope of the disclosure as defined by the appended claims.

DETAILED DESCRIPTION

Introduction

Disclosed herein are methods, systems, and processes to include data in a backup stream. The backup stream is backed up at a storage location (e.g., by a backup server) in a manner that minimizes, mitigates, and/or prevents fragmentation (e.g., of a backup set) caused by the inclusion of the data in the backup stream. One technology that can employ such methods, systems, and processes is NetBackup Accelerator, provided by Symantec Corporation of Mountain View, Calif.

Approaches such as those described herein can improve the speed of synthetic full backup operations. For example, such an approach can be designed to combine changed data with a list of data that has already been backed up during a previous full or incremental backup operation (e.g., by using a state file) and deduplicates this combination of data. Therefore, by independently tracking and deduplicating data that has already been backed up, approaches such as those described herein only require changed data to create a synthetic full backup set in roughly the same time it takes to run an incremental backup operation. However, including changed data with data that has already been backed up can, over time, result in fragmentation of data backed up in the synthetic full backup, thus negatively affecting rehydration performance.

FIG. 1A is a simplified block diagram that illustrates a computing system that creates and/or generates a backup stream, according to one embodiment. As shown in FIG. 1A, the computing system includes a client 105 which implements a virtual machine 110. In this example, virtual machine 110 generates data (e.g., application data) which is included in backup stream 120 and sent to backup server 115. Backup server 115 then stores the data in a backup image 140 on storage device 135. Data 130 (e.g., in the form of storage units) generated and/or modified by virtual machine 110 also includes metadata 125.

Metadata 125 can, for example, be used in performing backup operations. For example, metadata 125 can include information such as a header, a tail, a backupID, an offset, a block size, etc. for storage units generated and/or modified by virtual machine 110. If a given storage unit has been previously backed up (e.g., as part of a prior incremental and/or full backup operation), just the metadata for the previously backed up storage unit can be included in backup stream 120 (thus obviating the need to prepare and send data that has already been backed up). The metadata can then be used (e.g., by a backup application) to identify and locate the previously backed up data (i.e., storage unit) to create a full, incremental, or synthetic full backup.

As shown in FIG. 1A, client 105 is coupled to storage device 135 via a network 145. Storage device 135 can be a persistent or non-persistent storage device. Storage device 135 can include one or more of a variety of different storage devices, including hard disks, compact discs, digital versatile discs, solid state drive (SSD) memory such as Flash memory, and the like, or one or more logical storage devices such as volumes (e.g., virtual disks) implemented on one or more such physical storage devices. Storage device 135 can provide persistent storage because data stored on storage device 135 can be maintained (e.g., for a non-negligible time, such as several minutes, hours, days, weeks, etc.) even if power to storage device 135 and/or to a drive that reads and writes to storage device 135 is interrupted or cycled off for a non-negligible time.

Client 105, backup server 115, and storage device 135 can be integrated (e.g., where the storage device is coupled to the computing device's internal processing devices by an internal bus and is built within the same chassis as the rest of the computing device) or separate. If separate, client 105, backup server 115, and storage device 135 can be coupled by a local connection (e.g., using a technology such as Bluetooth™, Peripheral Component Interconnect (PCI), Small Computer System Interface (SCSI), or the like), or (as shown in this example) via one or more networks 145 such as the Internet or a storage area network (SAN).

Figure 1B:
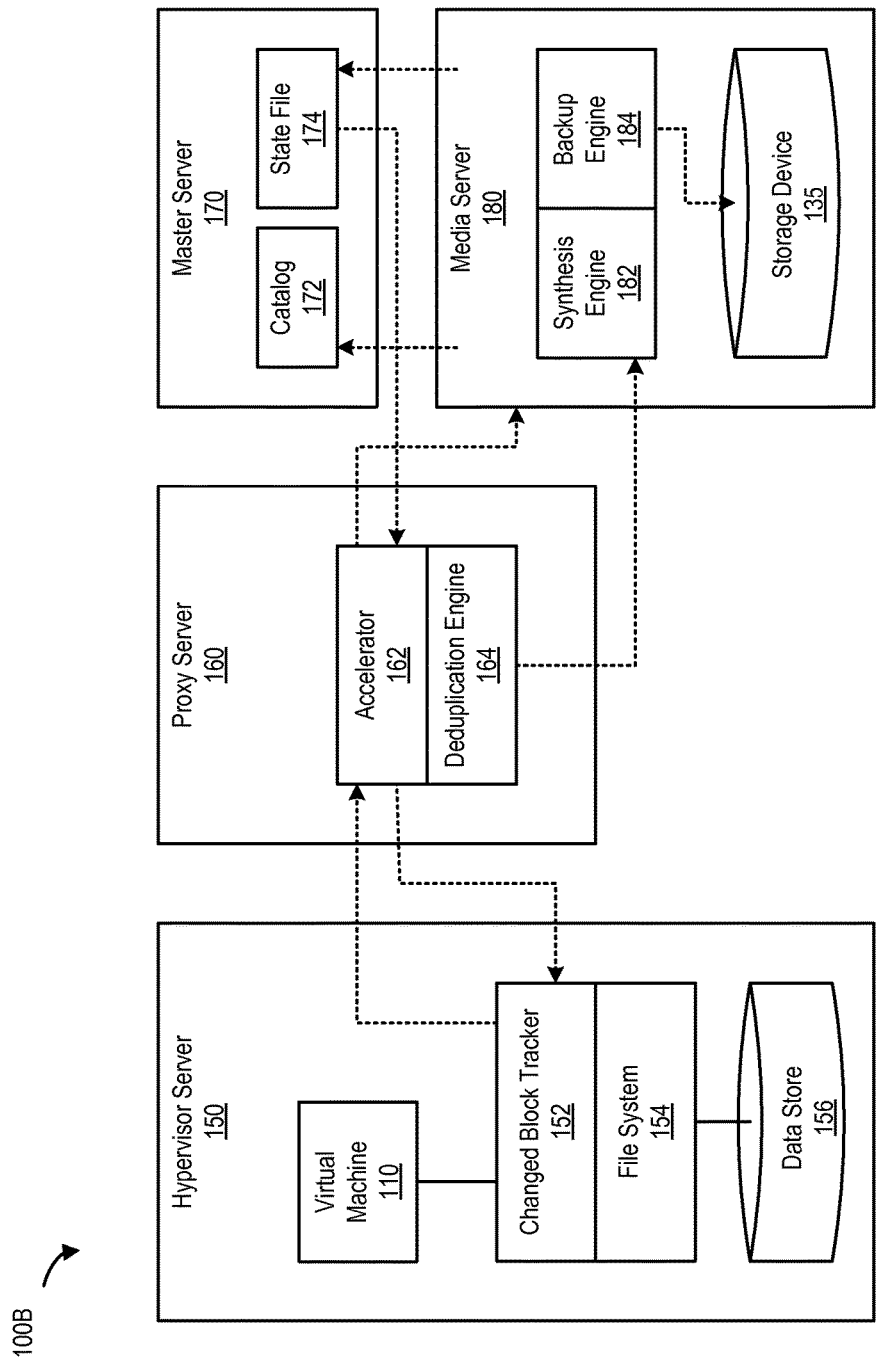
FIG. 1B is a simplified block diagram of a computing system that mitigates fragmentation in synthetic full backups, according to one embodiment.

FIG. 1B is a simplified block diagram of a computing system that creates synthetic full backups in roughly the same time it takes to run an incremental backup operation, according to one embodiment. FIG. 1B includes a hypervisor server 150, a proxy server 160, a master server 170, and a media server 180. Hypervisor server 150 implements virtual machine 110, and includes a changed block tracker 152, a file system 154, and a data store 156. Proxy server 160 includes an accelerator 162 and a deduplication engine 164. Master server 170 includes a catalog 172 and a state file 174. Media server 180 includes synthesis engine 182 and backup engine 184. Backup engine 184 is coupled to storage device 135, which can be used to store one or more backup images (e.g., backup image 140) of one or more corresponding backup sets (as shown in FIG. 1A). It will be appreciated that, while state file 174 is depicted as being maintained at master server 170, such need not necessarily be the case. State file 174 can be maintained on media server 180 or at any location in the computing system of FIGS. 1A and 1B.

To create a synthetic full back up set in approximately the same time it takes to run an incremental backup operation, accelerator 162 first requests and obtains changed storage units (e.g., for each virtual disk included in the backup operation) from virtual machine 110. Virtual machine 110 running on hypervisor server 150 can track storage units (e.g., disk sectors) that have changed, using changed block tracker 152, for example. Once identified, changed storage units from virtual machine 110 are sent to proxy server 160.

Next, state file 174, which stores information about each storage unit (e.g., about each extent of data on a virtual disk), is obtained and/or retrieved from master server 170. In some embodiments, state file 174 can be made available on proxy server 160, which in this example, functions as a virtual machine proxy host and/or a backup host. State file 174 includes information about storage units which have already been backed up to storage device 135 by backup engine 184 (e.g., as part of a previous full or incremental backup).

Based on the information in state file 174, accelerator 162 combines changed storage units with a list of storage units that have been already backed up (e.g., information identifying existing storage units in a full or incremental backup, as obtained from state file 174). Accelerator 162 then transfers this combined data and information to deduplication engine 164. Once this combined data is deduplicated (e.g., to remove storage units that have been already and/or previously backed up), a synthetic full backup is generated on media server 180 (e.g., using synthesis engine 182). State file 174 is then updated by media server 180 and transferred to master server 170 after the backup of each virtual disk is completed.

It should be noted that accelerator 162 need only generate catalog data for the changed storage units. When media server 180 generates the synthetic full backup (e.g., using synthesis engine 182 as noted above), accelerator 162 transfers catalog information (e.g., information noting the location of the storage units in a backup image) for a full backup to master server 180. Therefore, a synthetic full backup operation performed using the computing system of FIG. 1B typically consumes as much catalog space as a traditional full backup, though catalog information can be stored incrementally, as well.

However, since accelerator 162 only requires changed data to create a synthetic full backup set, accelerator 162 can create the synthetic full backup set in approximately the same amount of time it takes to create an incremental backup set—a significant time-saving advantage. Further, by only sending the data and metadata for a full backup occasionally (and just incremental backups in between), such an approach avoids wasteful redundant operations. Unfortunately, and as noted above, including changed data (e.g., changed storage units) with data that has already been backed up can, over time, result in fragmentation of data backed up in the synthetic full backup, thus negatively affecting rehydration performance.

Including Storage Units in a Backup Stream

Figure 2A:
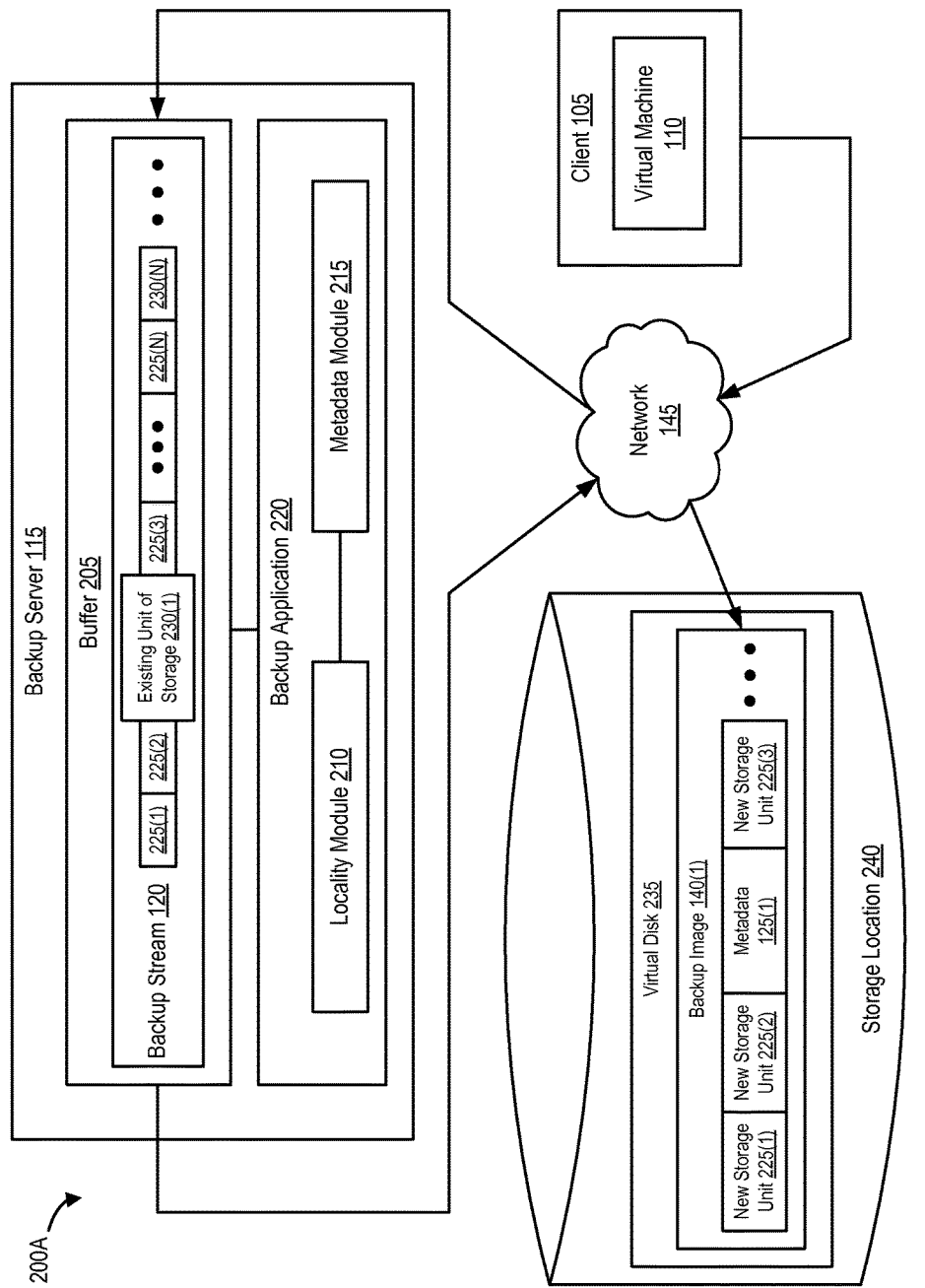
FIG. 2A is a simplified block diagram of a computing system that sends a backup stream to a backup server, according to one embodiment.

FIG. 2A is a simplified block diagram of a computing system that sends a backup stream to a backup server, according to one embodiment. Backup server 115 includes a buffer 205 which receives backup stream 120 from client 105 (e.g., via the Internet, a SAN, or network 145, among other means). Backup server 115 also includes and implements a backup application 220. Backup application 220 includes locality module 210 and metadata module 215. Locality module 210 tracks whether storage units have the same value (e.g., same data), or whether these storage units are frequently accessed from related storage locations in a backup image. Therefore, locality module 210 can track whether certain storage units are reused within a relatively small time duration, or whether two or more storage units are in relatively close storage locations (e.g., new storage units 225(1) and 225(2) in backup image 140(1) as shown in FIG. 2A).

Metadata module 215 manages metadata 125 of existing storage units 230(1)-(N) (those that may have already been backed up) and new storage units 225 (1)-(N) (those storage units that have changed, and this need to be backed up). For example, in FIG. 2A, existing storage unit 230(1) is a storage unit that has not been changed and/or modified by virtual machine 110, but is included in backup stream 120 because it may have not yet been backed up to backup image 140(1) (which is stored on virtual disk 235 at storage location 240). As noted above, accelerator 162 can access state file 174 to determine whether existing storage unit 230(1) has been previously backed up.

In one embodiment, locality module 210 makes determinations as to whether storage units (e.g., new storage units 225(1) and 225(2)) are frequently accessed, and in doing so, can instruct backup application 220 to include new storage units 225(1) and 225(2) in backup stream 120. Similarly, and according to another embodiment, locality module 210, in conjunction with metadata module 215 can determine whether existing storage units 230(1) and 230(N) are frequently accessed, or whether existing storage units 230(1) and 230(N) are relatively close to one another, with respect to their storage locations (e.g., if state file 174 indicates that existing storage units 230(1) and 230(N) have been previously backed up and are stored in the same backup image in close relative and spatial proximity).

However, to minimize, mitigate, and/or prevent fragmentation of a backup set in a backup image, merely determining whether certain storage units are reused within a relatively small time duration, or whether two or more storage units are in relatively proximate storage locations may not be enough. For example, if either the new storage units or existing storage units are too small in size, fragmentation can occur if these new storage units or existing storage units are included in a backup stream and sent to a backup server. Although not specifically described, it should be noted that other characteristics of storage units other than size (e.g., such as the placement of storage units in a backup image during the backup process) that can cause fragmentation if those storage units are included in a backup stream can also be used, alone or in combination, as characteristics of interest by the methods, processes, and systems described herein, and such use is contemplated by the present disclosure.

Figure 2B:
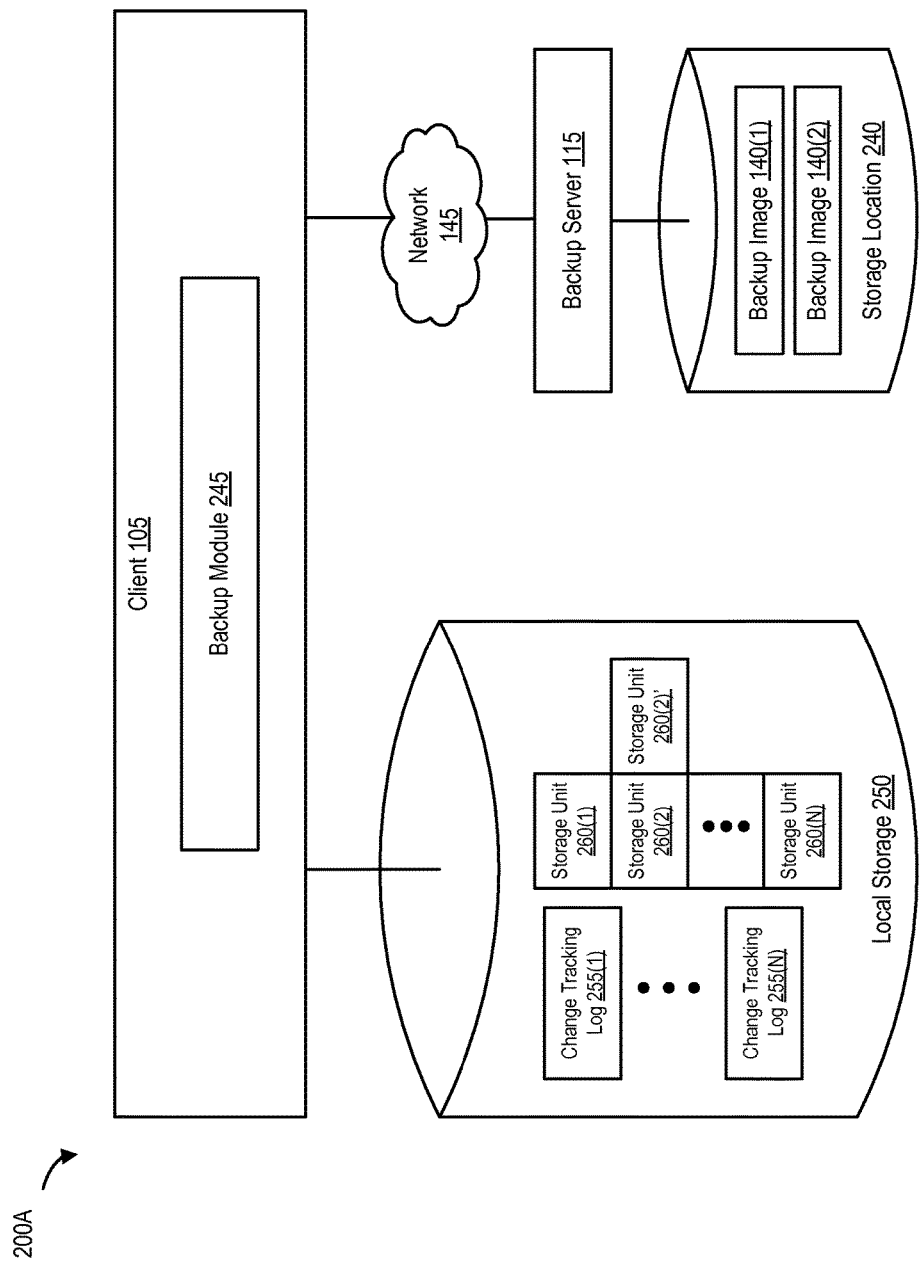
FIG. 2B is a simplified block diagram of a computing system that implements a backup module, according to one embodiment.

FIG. 2B is a simplified block diagram of a client that implements a backup module, according to one embodiment. Backup module 245 uses one or more change tracking logs (e.g., change tracking logs 255(1)-(N)) as shown in FIG. 2B or change block tracker 152 as shown in FIG. 1B to determine whether a storage unit has changed (e.g., the storage unit contains data that has been changed or modified in some manner)). Change tracking logs can be maintained in local storage (as shown in FIG. 2B) or can be maintained at a separate location by a client or some other computing entity (e.g., by hypervisor server 150 as shown in FIG. 1B). In this example, and according to one or more embodiments described herein, backup module 245 determines whether to include one or more storage units in a backup stream, and also determines when and whether to send the backup stream to backup server 115. As shown in FIG. 2B, backup server 115 stores the backup stream in one or more backup images (e.g., backup images 140(1) and 140(2)) in storage location 240.

Figure 2C:
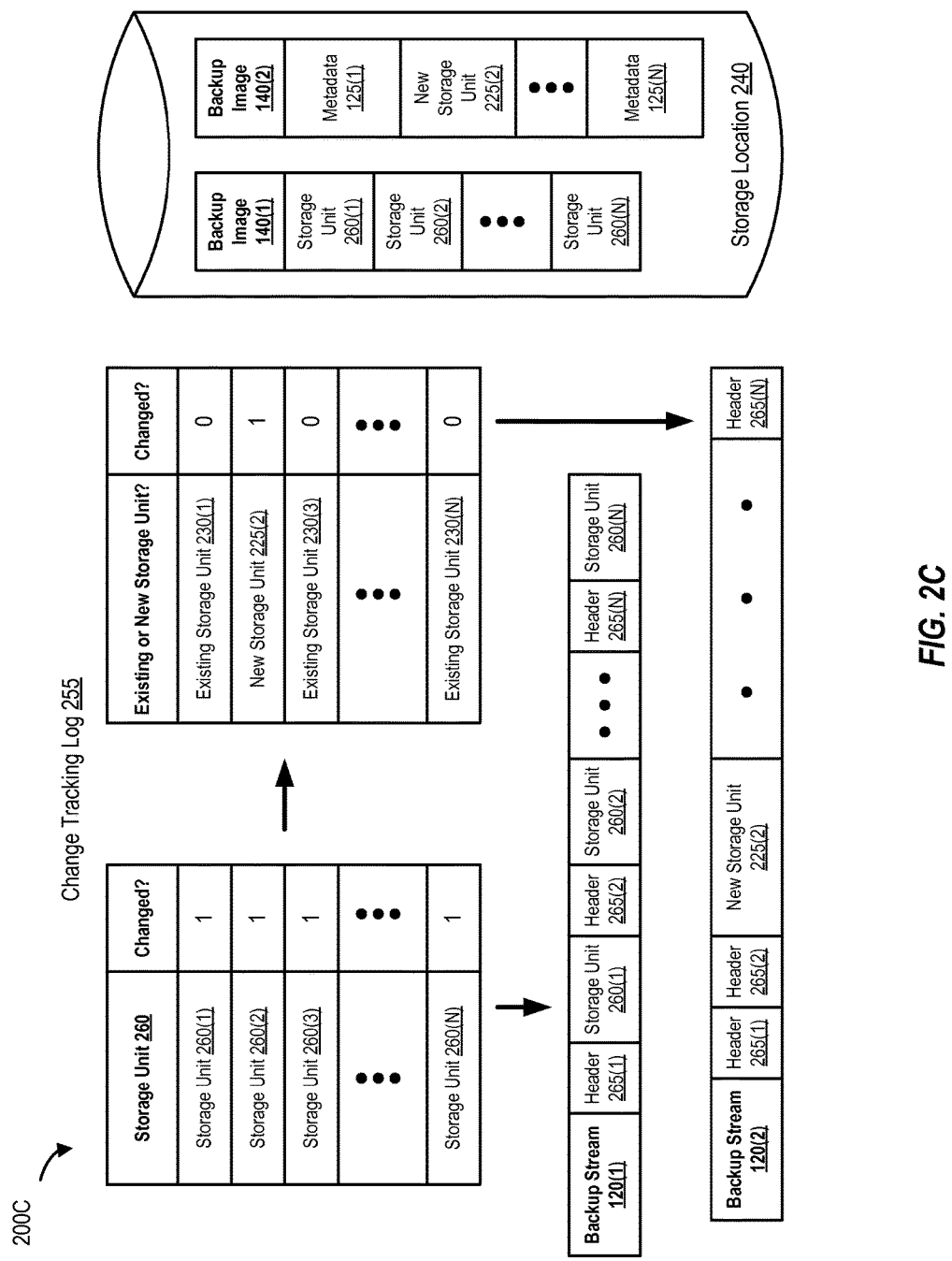
FIG. 2C illustrates a change tracking log that facilitates how changed data is backed up, according to one embodiment.

FIG. 2C is a simplified block diagram that illustrates how a change tracking log can be used to create one or more backup streams to be sent to a backup server (e.g., by accelerator 162 or backup module 245) to be stored as one or more backup images, according to one embodiment. According to FIG. 2C, if a storage unit has changed or has been modified in some manner (e.g., storage unit 260(1)), backup module 245 includes the storage unit in a backup stream (e.g., backup stream 120(1)) and sends the backup stream to backup server 115. Backup server 115 then stores the storage unit(s) in a backup image (e.g., backup image 140(1) or 140(2)).

In addition to the storage unit itself, backup module 245 also includes header information for the storage unit in the backup stream (e.g., header 265(1) for storage unit 260(1), header 265(2) for storage unit 260(2), etc.). A header is metadata that includes information indicating whether the storage unit is a new storage unit or an existing storage unit (e.g., whether the storage unit contains data which is new, or has been changed and/or modified in some fashion). As shown in FIG. 2C, only storage unit 260(2) has changed (shown as new storage unit 225(2) to reflect the storage unit's changed status). Therefore, backup module 245 only includes new storage unit 225(2) in backup stream 120(2) and includes headers 265(1) and 265(2) for existing storage units 230(1) and 230(3) respectively. As shown in FIG. 2C, backup stream 120(2) is stored in backup image 140(2) at storage location 240.

In some embodiments, backup images 140(1) (e.g., a full backup set) and 140(2) (e.g., an incremental backup set) can be used by accelerator 162 (or backup module 245) to create a synthetic full backup set. For example, accelerator 162 can use state file 174 to determine whether one or more storage units have already been backed up (e.g., as part of a previous full or incremental backup) in backup images 140(1) and/or 140(2). Accelerator 162 can then combine new storage units with a list of storage units that have been already been backed up. Upon deduplication (e.g., by deduplication engine 164 as shown in FIG. 1B), a synthetic backup set can be created from backup images 140(1) and 140(2).

Therefore, accelerator 162, in conjunction with backup module 245 can determine whether or not to include one or more storage units in a backup stream based on whether the one or more storage units have been changed and/or modified, or based on other criteria and characteristics of the one or more storage units as will described in greater detail below. In this manner, accelerator 162 and backup module 245 can customize a backup stream to be sent to a backup server to minimize, mitigate, and/or prevent fragmentation of a backup set caused by the inclusion of these one or more storage units in the backup stream.

Including Storage Units in a Backup Stream Based on a Threshold

In one embodiment, backup module 245 identifies one or more storage units (of multiple storage units) at a client (e.g., client 105 or virtual machine 110). In this example, the multiple storage units include one or more new storage units or one or more existing storage units (or both). In another embodiment, the existing storage units are storage units that are unchanged (e.g., the data in those storage units has not been modified according to a change tracking log or a change block tracker), but these existing storage units have also not necessarily been backed up as part of a prior full or incremental backup operation. As noted above, accelerator 162 can determine whether these one or more existing storage units have been previously backed up by accessing state file 174 (or state information) (as shown in FIG. 1B).

In some embodiments, backup module 245 accesses the storage units generated by a virtual machine at a client (e.g., virtual machine 110 at client 105 or at hypervisor server 150). Backup module 245 then determines whether one or more storage units meet a threshold. In this example, the threshold measures a characteristic (e.g., storage unit size, among other possibilities) of the one or more storage units. Backup module 245 includes the one or more storage units that meet the threshold in a backup stream, and sends the backup stream to a backup server.

In other embodiments, backup module 245 determines whether the one or more existing storage units meet an existing size threshold, and includes the one or more existing storage units that meet the existing size threshold in the backup stream. FIGS. 3A-3D are simplified block diagrams that illustrate the composition of backup streams at different points in time based on the application of an existing size threshold.

FIG. 3A is a simplified block diagram that illustrates backup stream 120(2) at time T(1) without the application of a threshold, according to one embodiment. Backup stream 120(2) includes several new storage units (e.g., storage units 225(1), 225(2), 225(3), 225(4), etc.), and metadata 125(1)-(4) indicating existing storage units which may have already been previously backed up. As shown, backup stream 120(2) includes several small storage units of data that may have been previously backed up (e.g., shown as metadata 125(1)-(4)) that can cause fragmentation in a synthetic full backup if one is later created from backup stream 120(2) at time T(1).

In some embodiments, backup module 245 waits for the client to generate additional data prior to including one or more existing storage units in the backup stream if the one or more existing storage units do not initially meet an existing size threshold (e.g., at time T(1)). In this example, the additional data at time T(2) may include one or more existing storage units (e.g., metadata 125(4) associated with existing storage unit 230(4)) that are larger in size than the one or more previous existing storage units that did not meet the existing size threshold. In one embodiment, newly generated data with one or more existing storage units may be larger at time T(2) because a new storage unit which may have previously existed in between two existing storage units may have been modified and/or combined with other new storage units thus resulting in a bigger existing storage unit which meets the existing size threshold (as a result of the combination of the two existing storage units surrounding the previously existing new storage unit).

FIG. 3B is a simplified block diagram that illustrates the application of an existing size threshold to backup stream 120(2) at time T(2), according to one embodiment. Once applied, only metadata 125(4) (associated with existing storage unit 230(4)) meets the existing size threshold. Therefore, at time T(2), and upon application of the existing size threshold, backup stream 120(2) only includes new storage units 225(1)-(4) and metadata 125(4) because only metadata 125(4) meets the existing size threshold. By including only metadata 125(4) and not metadata 125(1)-(3), backup module 245 can minimize, mitigate, and/or prevent the fragmentation of data in a synthetic full backup if one is created from backup stream 120(2) when it is backed up at time T(2) (e.g., in backup image 140(2)).

FIG. 3C is a simplified block diagram that illustrates the application of an existing size threshold to backup stream 120(2) at time T(3), according to one embodiment. Given that more time has passed since time T(2), backup stream now includes new storage units 225(4)-(6) (changed data since time T(2)) in addition to new storage units 125(1)-(3). However, only metadata 125(1) is included in backup stream 120(3) at time T(3) because the other existing storage units (e.g., metadata 125(2)-(4)) do not meet the existing size threshold. Therefore, at time T(3), and upon continued application of the existing size threshold (e.g., from time T(2) to time T(3)), backup stream 120(2) only includes new storage units 225(1)-(6) and metadata 125(1) because only metadata 125(1) meets the existing size threshold. By including only metadata 125(1) and not metadata 125(2)-(4), backup module 245 can minimize, mitigate, and/or prevent the fragmentation of data in a synthetic full backup if one is created from backup stream 120(2) when it is backed up at time T(3).

In some embodiments, backup module 245 determines whether a span of storage units includes more new storage units than existing storage units (as shown in FIG. 3C), and includes the span of storage units in the backup stream if the span of storage units includes more new storage units than existing storage units (as shown in FIG. 3D). As shown in FIG. 3D, the included span of storage units can be merged by backup module 245 prior to inclusion in the backup stream (e.g., merged new storage units 225(1-3) and 225(4-6)).

FIG. 3D is a simplified block diagram that illustrates the application of an existing size threshold to backup stream 120(N) at time T(N), according to one embodiment. Given that more time has passed since time T(3), backup stream now includes new storage units 225(1-3) (changed data since time T(3)) in addition to new storage units 125(4-6). However, only metadata 125(1) is included in backup stream 120(N) at time T(N) because the other existing storage units (e.g., associated with metadata 125(2)-(4)) do not meet the existing size threshold. Therefore, at time T(N), and upon continued application of the existing size threshold (e.g., from time T(3) to time T(N)), backup stream 120(2) only includes new storage units 225(1-3) and 225 (4-6) and metadata 125(1) because only metadata 125(1) meets the existing size threshold. By including only metadata 125(1) and not metadata 125(2)-(4), backup module 245 can minimize, mitigate, and/or prevent the fragmentation of data in a synthetic full backup if one is created from backup stream 120(2) when it is backed up at time T(N).

In some embodiments, backup module 245 determines whether the one or more new storage units meet a new size threshold, and includes the one or more new storage units that meet the new size threshold in the backup stream. FIGS. 4A-4D are simplified block diagrams that illustrate the composition of backup streams at different points in time based on the application of a new size threshold.

FIG. 4A is a simplified block diagram that illustrates backup stream 120(3) at time T(1) without the application of a threshold, according to one embodiment. Backup stream 120(3) includes several new storage units (e.g., storage units 225(1), 225(2), 225(3), and 225(4)), and metadata 125(1)-(4) indicating existing storage units which may have already been previously backed up. As shown, backup stream 120(3) includes several small storage units of data that may have been previously backed up (e.g., shown as metadata 125(1)-(4)) that can cause fragmentation in a synthetic full backup if one is later created from backup stream 120(3) at time T(1).

In some embodiments, backup module 245 waits for the client to generate additional data prior to including one or more new storage units in the backup stream if the one or more new storage units do not initially meet a new size threshold (e.g., at time T(1)). In this example, the additional data at time T(2) may include one or more new storage units (e.g., new storage unit 225(4)) that are larger in size than the one or more previous new storage units that did not meet the new size threshold.

FIG. 4B is a simplified block diagram that illustrates the application of a new size threshold to backup stream 120(3) at time T(2), according to one embodiment. Once applied, only new storage unit 225(4) meets the new size threshold. Therefore, at time T(2), and upon application of the new size threshold, backup stream 120(3) only includes metadata 125(1)-(3) and new storage unit 225(4) because only new storage unit 225(4) meets the new size threshold. By including only new storage unit 225(4) and not new storage units 225(1)-(3), backup module 245 can minimize, mitigate, and/or prevent the fragmentation of data in a synthetic full backup if one is created from backup stream 120(3) when it is backed up at time T(2) (e.g., in backup image 140(3)).

FIG. 4C is a simplified block diagram that illustrates the application of a new size threshold to backup stream 120(3) at time T(3), according to one embodiment. Given that more time has passed since time T(2), backup stream now includes new storage units 225(1)-(3) (changed data since time T(2)) in addition to metadata 125(1)-(2). However, only new storage units 225(1)-(3) are included in backup stream 120(3) at time T(3) because the other new storage unit (e.g., new storage unit 225(4)) does not meet the new size threshold. Therefore, at time T(3), and upon continued application of the new size threshold (e.g., from time T(2) to time T(3)), backup stream 120(3) only includes new storage units 225(1)-(3) and metadata 125(1) and 125 (2) because only new storage units 225(1)-(3) meet the new size threshold. By including only new storage units 225(1)-(3) and not new storage unit 225(4), backup module 245 can minimize, mitigate, and/or prevent the fragmentation of data in a synthetic full backup if one is created from backup stream 120(4) when it is backed up at time T(3) (e.g., as part of a full and/or incremental backup operation).

FIG. 4D is a simplified block diagram that illustrates the application of an existing size threshold to backup stream 120(N) at time T(N), according to one embodiment. In some embodiments, backup module 245 determines whether a span of storage units includes more new storage units than existing storage units (as shown in FIG. 4C, or other such relationship, either alone or in combination), and includes the span of storage units in the backup stream if the span of storage units includes more new storage units than existing storage units (as shown in FIG. 4D). In other embodiments, backup module 245 can also merge two or more new storage units if the two or more new units of storage do not meet the new size threshold, and can include the merged two or more new storage units in the backup stream. As shown in FIG. 4D, the included span of storage units can be merged by backup module 245 prior to inclusion in the backup stream (e.g., contiguous storage units 225(1), 225(2), and 225(3) merged into one new storage unit 225(1-3)). As will be appreciated, in view of the present disclosure, such criteria can include percentages, number of spans greater than/less than a given size, and other such criteria.

Figure 5:
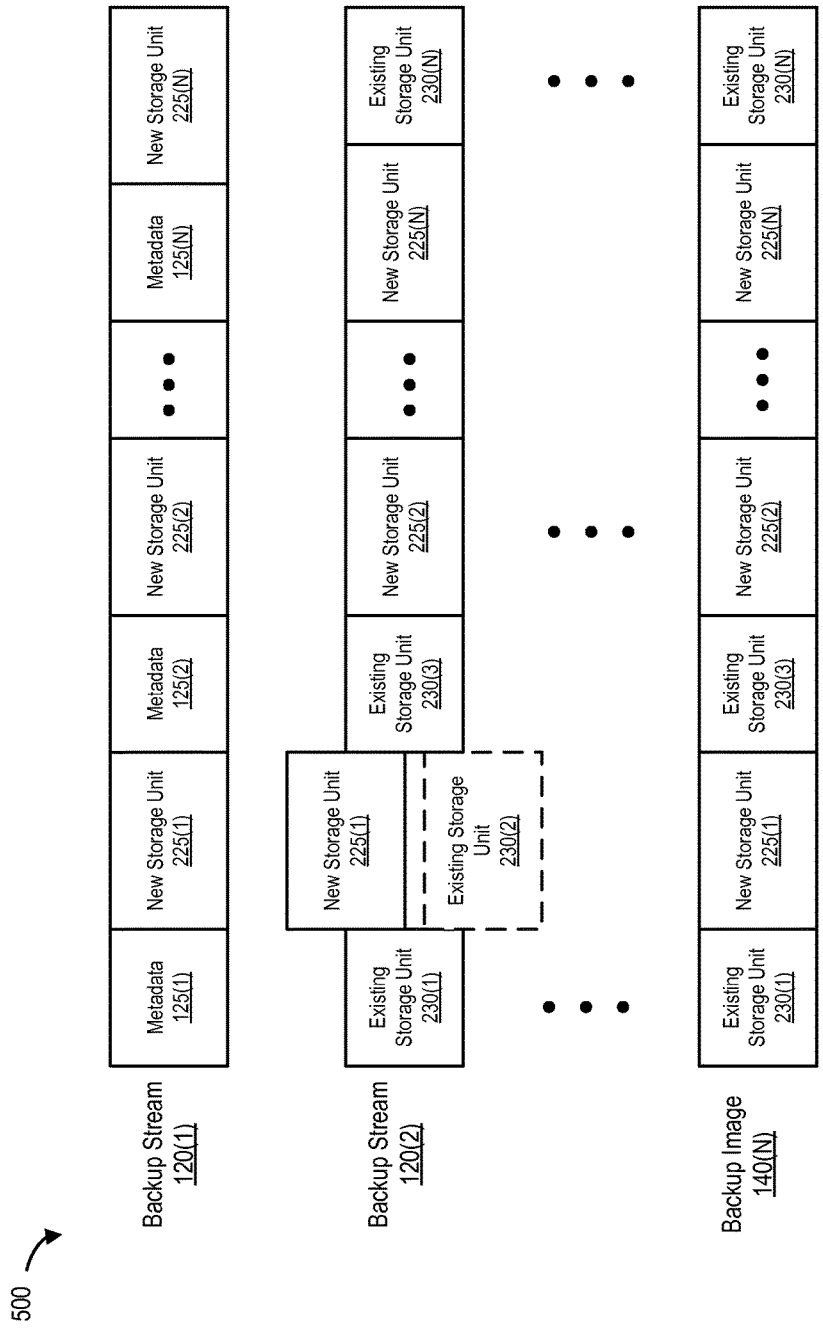
FIG. 5 is a simplified block diagram that illustrates the backup streams and a backup image, according to one embodiment.

FIG. 5 is a simplified block diagram that illustrates the composition of multiple backup stream and an Nth backup image based on storage units included in the backup stream by backup module 245 (or accelerator 162), according to one embodiment. In some embodiments, accelerator 162 can include storage units over a storage unit border in a previous backup image. Therefore, if a new storage unit is included that lies on a border between new and existing storage units, fragmentation can occur in a synthetic full backup set. In other embodiments, accelerator 162 can also include a new storage unit that covers such a storage unit border in a backup image. Therefore, if a new storage unit is included over a storage unit in a backup image, fragmentation can also occur in a synthetic full backup.

In one embodiment, if a new storage unit is included that covers a storage unit border in a previous backup image, backup module includes a new storage unit (e.g., new storage unit 225(1) as shown in FIG. 5) or one large new storage unit along with one large existing storage unit. In this example, both the one large new storage unit and the one large existing storage unit meet the new size threshold and the existing size threshold respectively. In another embodiment, if a new storage unit is included over a storage unit in a backup image, backup module includes a new storage unit (e.g., new storage unit 225(1) as shown in FIG. 5) or includes two large new storage units along with one existing storage unit. In some embodiments, by including a new storage unit, one large new storage unit along with one large existing storage unit, or two large new storage units along with one existing storage unit, accelerator can log the Nth last image information (as shown in FIG. 5), for example, to a catalog file (e.g., catalog file 172).

Determining which Storage Units to Backup

Figure 6A:
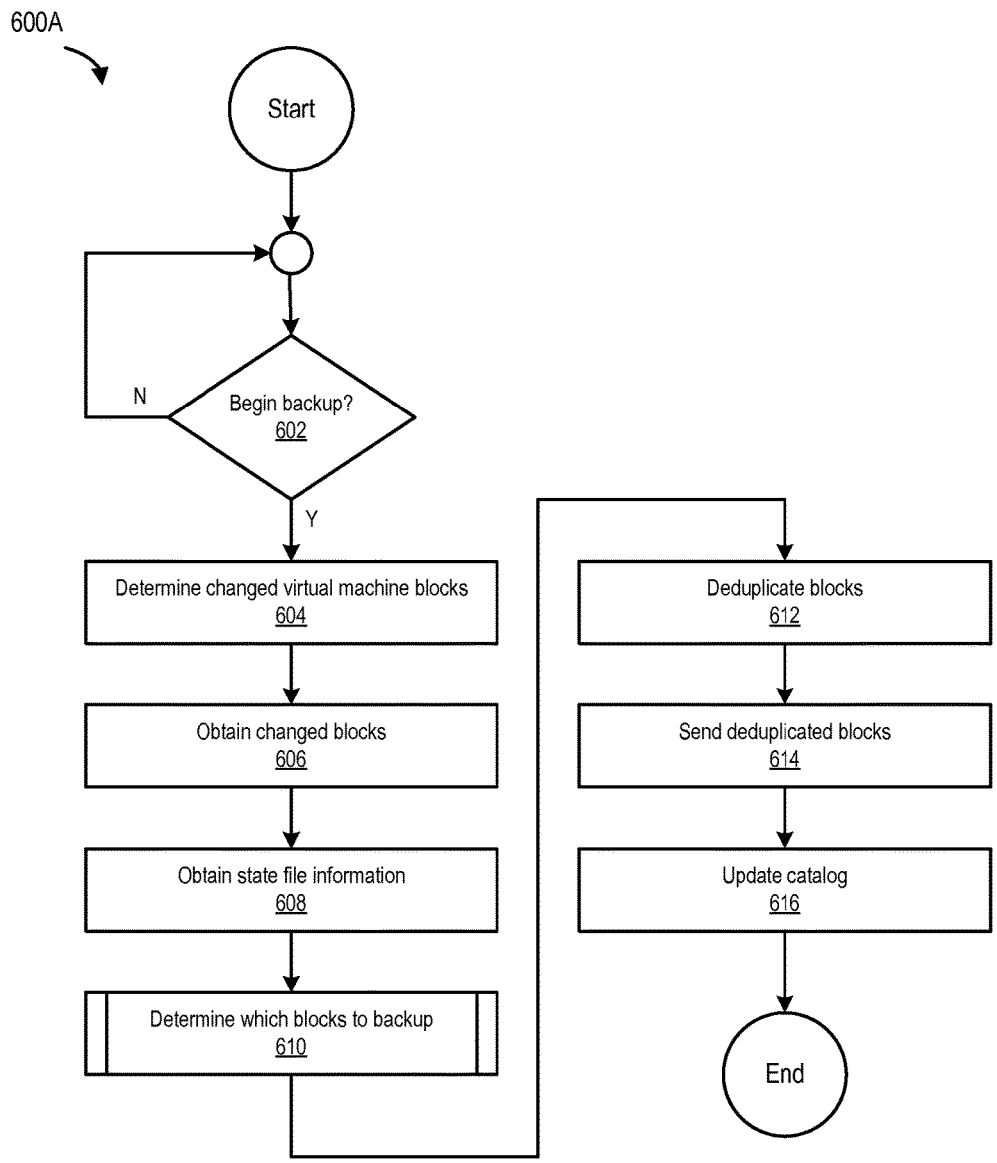
FIG. 6A is a flowchart that illustrates a process for determining which storage units to backup, according to one embodiment.

FIG. 6A is a flowchart that illustrates a process for determining which storage units to backup, according to one embodiment. In some embodiments, the process is performed by accelerator 162 or backup module 245. The process begins at 602 by determining if a backup operation is requested (e.g., by client 105 or by a user of virtual machine 110). If a backup operation is requested, the process, at 604, determines changed virtual machine blocks (e.g., one or more storage units that have been changed and/or modified by virtual machine 110 in some manner). In one embodiment, whether one or more blocks have been changed can be determined by accessing a changed block tracker such as changed block tracker 152 of FIG. 1B or by accessing a change tracking log such as change tracking log 255 of FIG. 2B. At 606, the process obtains the changed blocks. At 610, the process determines which blocks (e.g., storage units) to backup (e.g., so as to minimize, mitigate, and/or prevent fragmentation in a backup image and improve rehydration performance).

At 612, the process deduplicates the blocks (which include new blocks as well as existing blocks that may have been previously backed up). The deduplication process can be performed by deduplication engine 164 and can remove blocks from the backup stream that have been previously backed up (e.g., by accessing state file 174 which indicates which blocks have been previously backed up and/or duplicate blocks within the backup stream). At 614, the process sends the deduplicated blocks (e.g., to media server 180 to be synthesized for a synthetic full backup by synthesis engine 182 and backed up to storage device 135 by backup engine 184). The process ends at 616 by updating catalog file 172. As noted above, and in one embodiment, accelerator 162 only generates catalog data for the changed blocks.

Figure 6B:
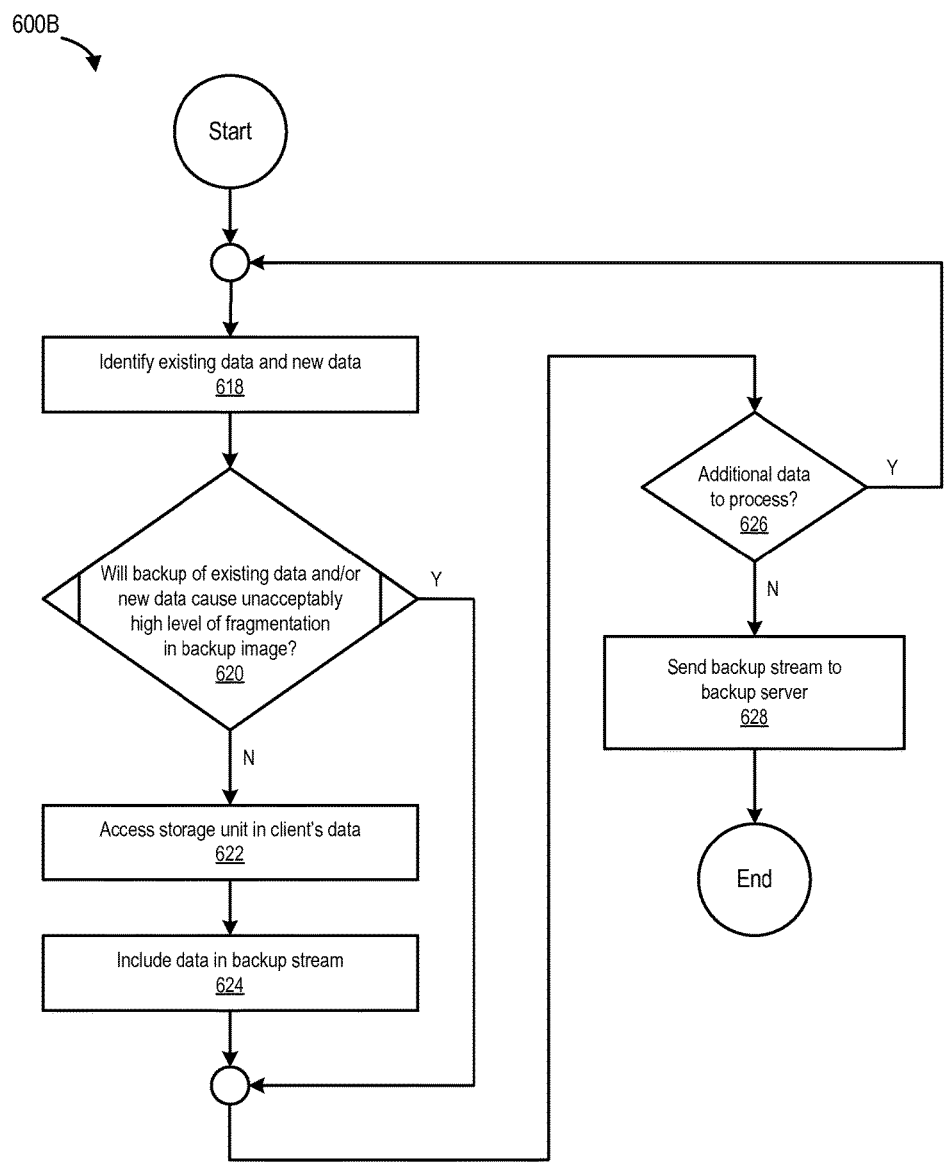
FIG. 6B is a flowchart that illustrates a process for determining whether backing up certain storage units will cause an unacceptably high level of fragmentation in a backup image, according to one embodiment.

FIG. 6B is a flowchart that illustrates a process for determining whether backing up existing storage units and/or new storage units will cause an unacceptably high level of fragmentation in a backup image (e.g., in a synthetic full backup set), according to one embodiment. The process begins at 618 by identifying existing data and new data generated, for example, by virtual machine 110. At 620, the process determines whether backing up the existing data and/or the new data will cause an unacceptably high level of fragmentation in a backup image (e.g., a synthetic full backup set/image). At 622, the process accesses storage units in client's data (e.g., in data store 156 as shown in FIG. 1B) and, at 624, includes the data in a backup stream only if backing up the existing data and/or the new data will not cause an unacceptably high level of fragmentation in a backup image.

If backing up the existing data and/or the new data will cause an unacceptably high level of fragmentation in a backup image, the process will not include the data in the backup stream. At 626, the process determines if there is additional data to process. If there is no additional data to process, the process ends at 628 by sending the backup stream (e.g., backup stream 120) to the backup server (e.g., backup server 115).

Figure 6C:
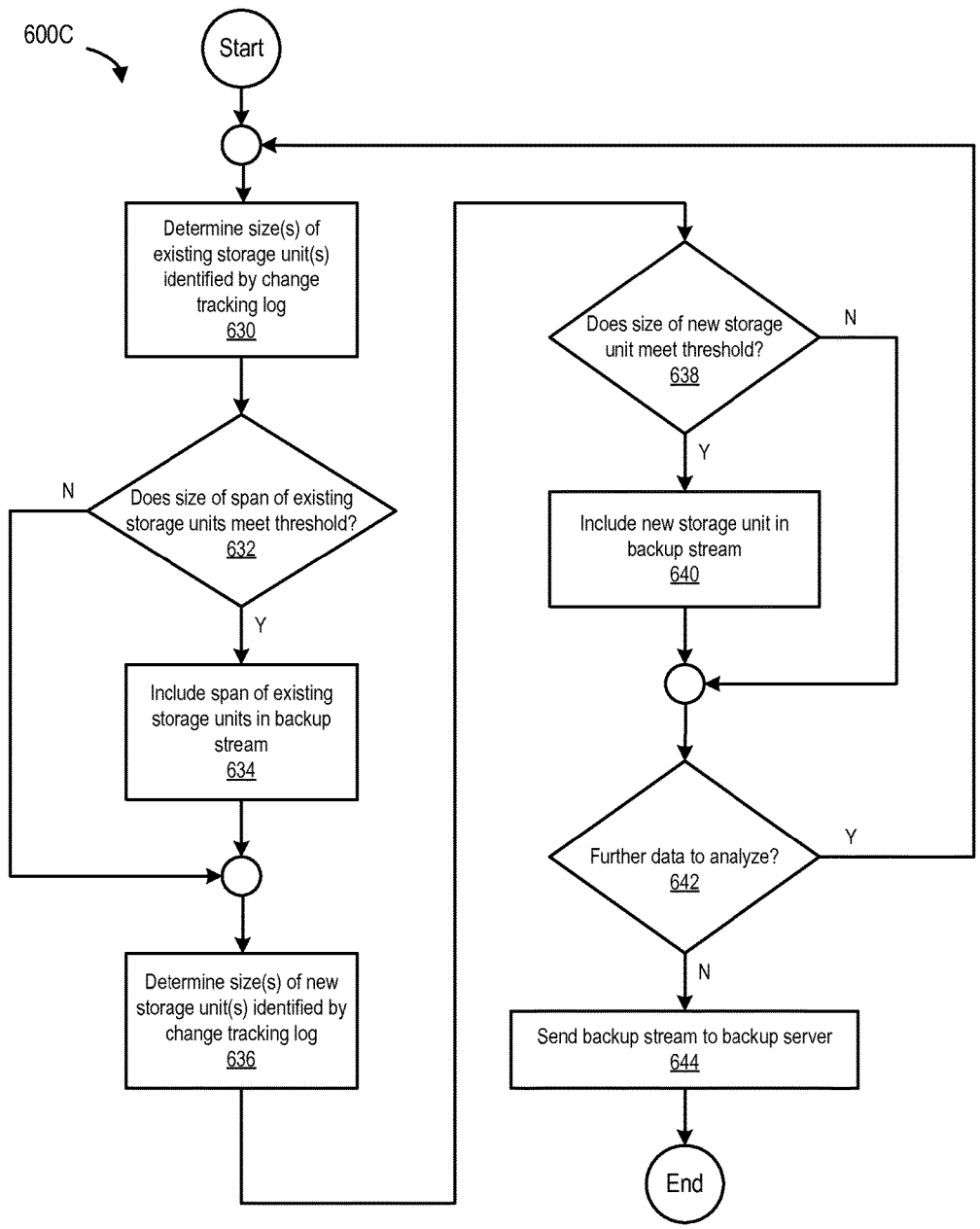
FIG. 6C is a flowchart that illustrates a process for determining which storage units to include in a backup stream, according to one embodiment.

FIG. 6C is a flowchart that illustrates a process for determining which existing storage units and/or new storage units to include in a backup stream based one or more thresholds, according to one embodiment. The process begins at 630 by determining the size(s) of existing storage unit(s) identified by a change tracking log (e.g., change tracking log 255 as shown in FIG. 2B or changed block tracker 152 as shown in FIG. 1B). At 632, the process determines if the size of a span of existing storage units meet a threshold (e.g., an existing size threshold). At 634, the process includes the span of existing storage units in a backup stream only if the size of the span of existing storage units meets the threshold.

At 636, the process determines the size(s) of new storage unit(s) identified by a change tracking log (e.g., change tracking log 255 as shown in FIG. 2B or changed block tracker 152 as shown in FIG. 1B). At 638, the process determines if the size of a new storage units meet a threshold (e.g., a new size threshold). At 640, the process includes the new storage unit in the backup stream only if the size of the new storage unit meets the threshold. At 642, the process determines if there is any further data to analyze. If additional data requires to be backed up, the process repeats to backup this remaining data. If there is no further data to analyze, the process ends at 644 by sending the backup stream to the backup server.

Figure 6D:
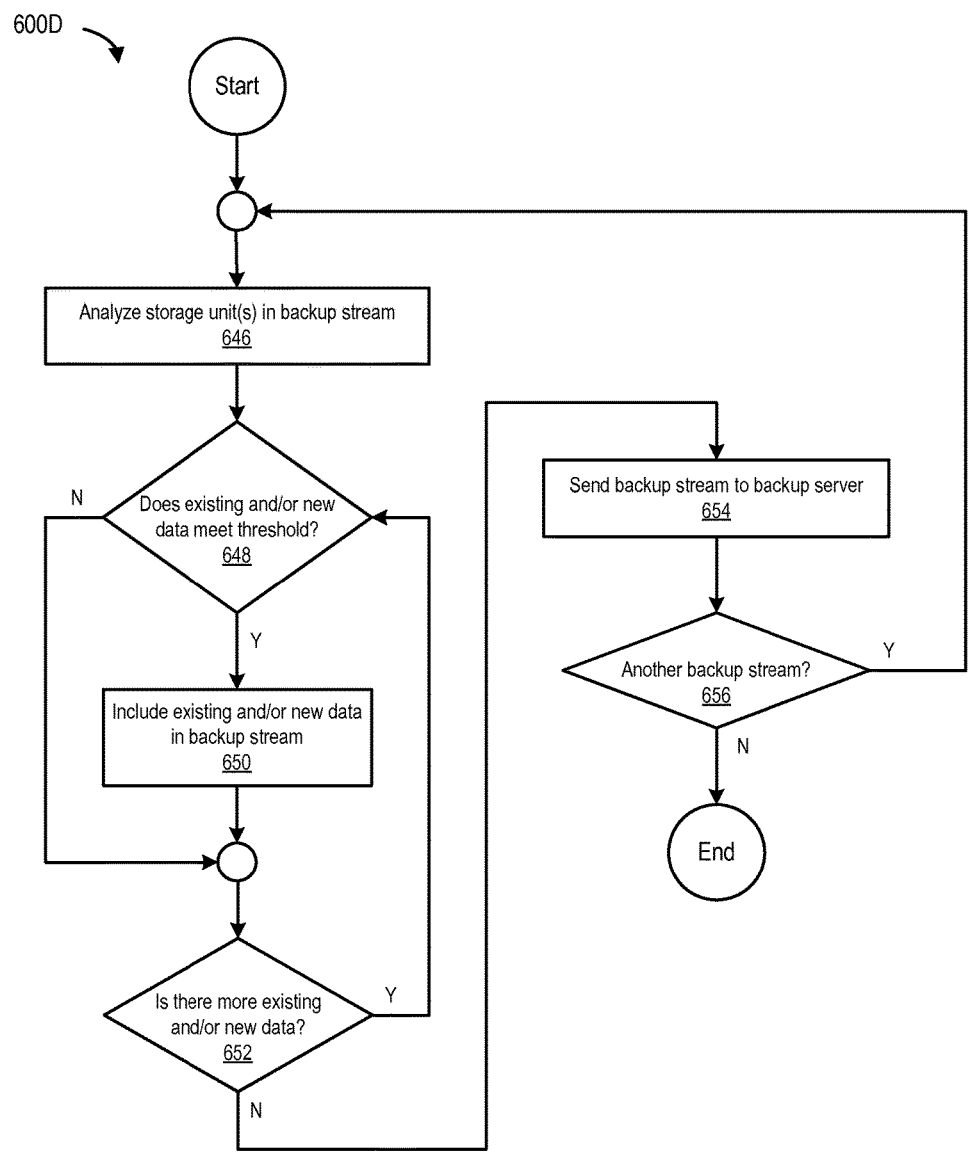
FIG. 6D is a flowchart that illustrates a process for determining whether certain storage units meet a threshold, according to one embodiment.

FIG. 6D is a flowchart that illustrates process for determining whether both existing storage units and/or new storage units meet a threshold, according to one embodiment. The process begins at 646 by analyzing available storage unit(s) in a backup stream. At 648, the process determines if existing data and/or new data meets a threshold. At 650, the process permits the inclusion of the existing data and/or new data in the backup stream only if the existing data and/or new data meets the threshold. In this example, the threshold that is used is the same for existing storage units and new storage units and can be a size or a locality based threshold. At 652, the process determines if there is more existing data and/or new data to analyze. If there is no more data to analyze, the process, at 654, sends the backup stream to the backup server. At 656, the process determines if there is another backup stream to analyze. If other backup streams need to analyzed, the process loops to 646. If there are no more backup streams to analyze, the process ends at 656.

Sending a Backup Stream to a Backup Server

Figure 7A:
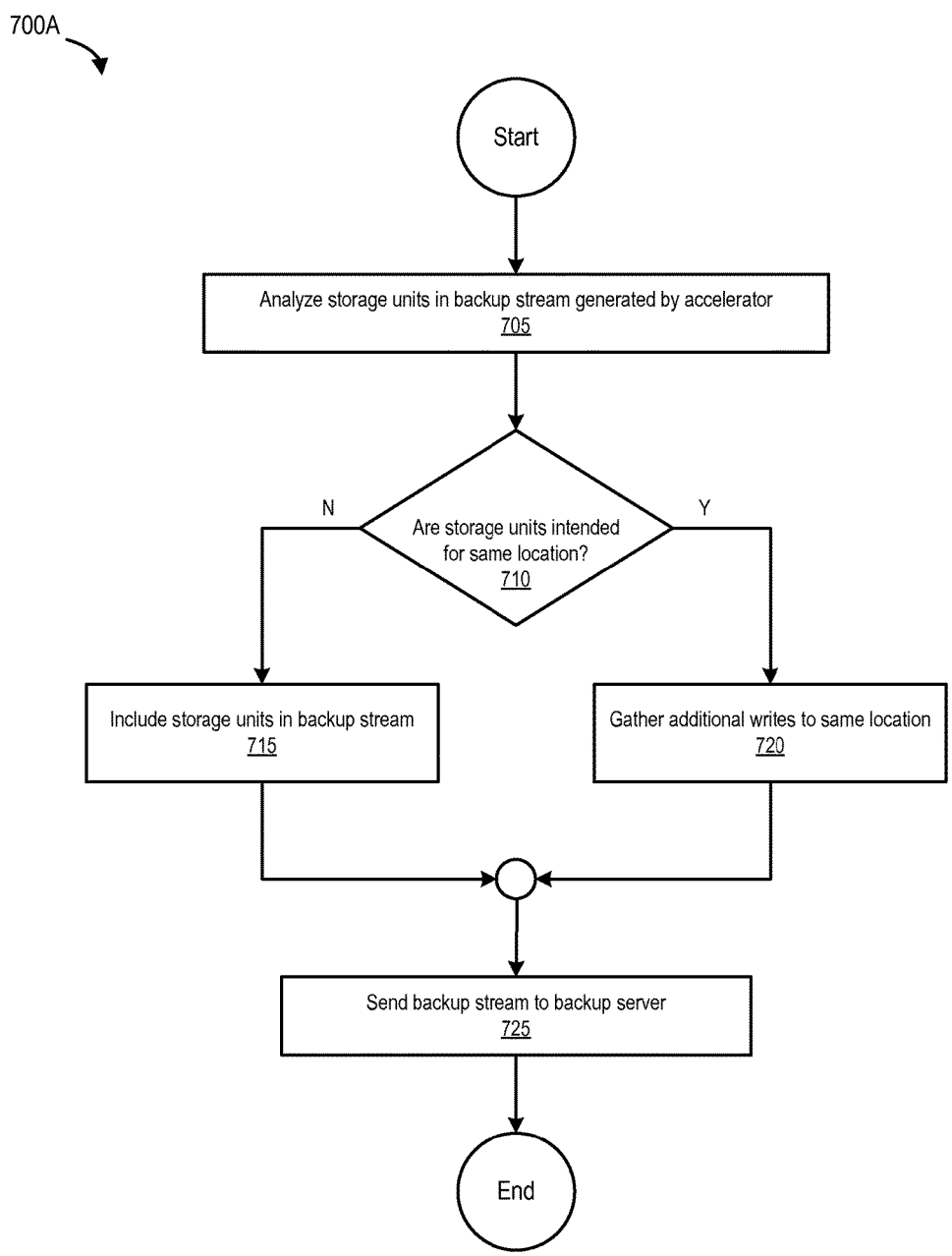
FIG. 7A is a flowchart that illustrates a process for determining whether certain storage units should be included in a backup stream, according to one embodiment.

FIG. 7A is a flowchart that illustrates a process for determining whether storage units intended for the same location should be included in a backup stream, according to one embodiment. The process begins at 705 by analyzing storage units in a backup stream generated by accelerator 162 (or by backup module 245). At 710, the process determines if the storage units are intended for the same location (e.g., in a backup image after being backed up by backup engine 184). If the storage units are not intended for the same location, the process, at 715, includes the storage units in a backup stream.

However, if the storage units are intended for the same location, the process, at 720, gathers additional writes to the same location (e.g., instead of including the storage units in the backup stream upon the first backup request, backup module 245 can wait for a subsequent backup request before including those storage units in a backup stream to be sent to the backup server). The process ends at 725 by sending the backup stream to the backup server.

Figure 7B:
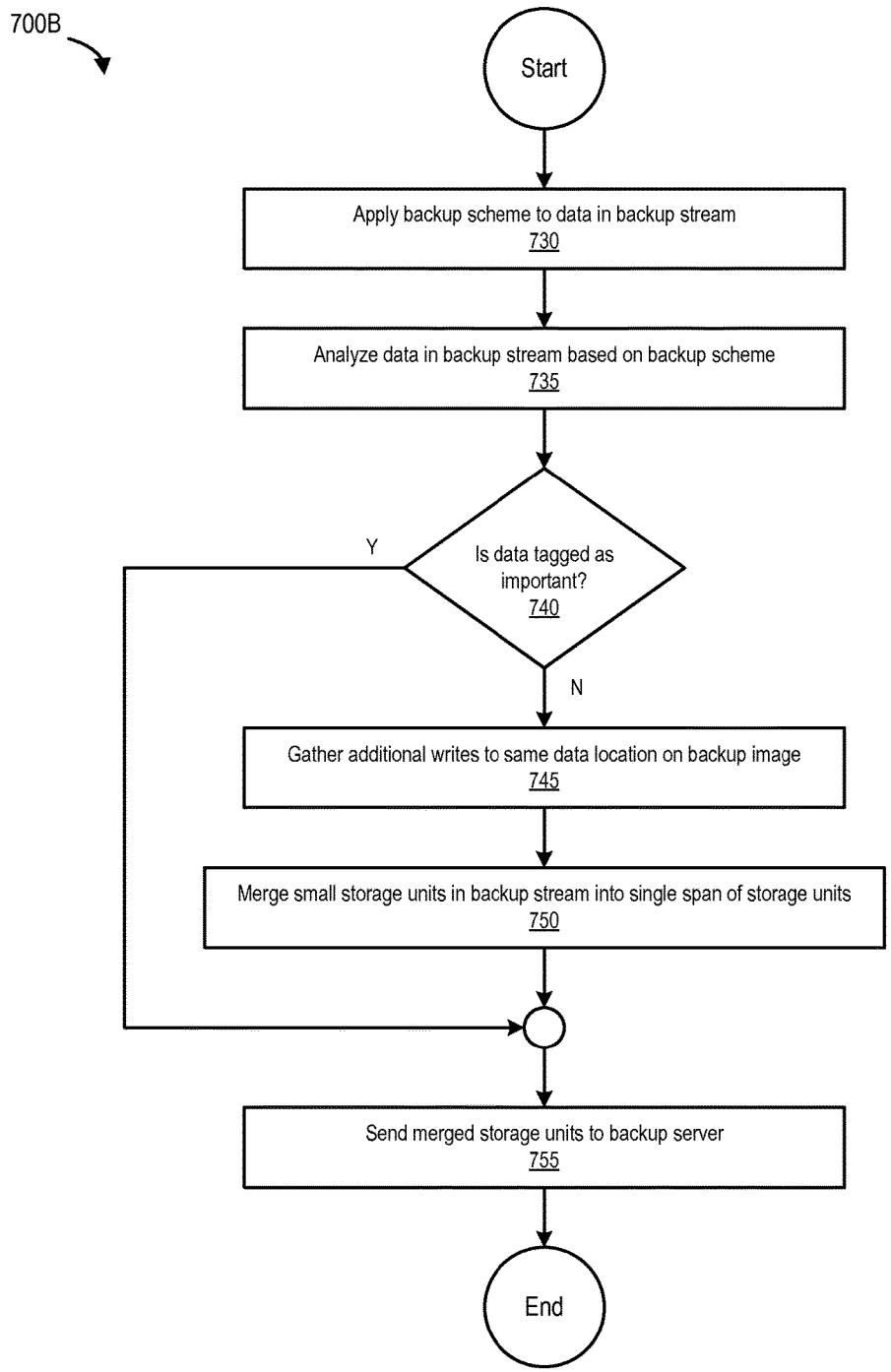
FIG. 7B is a flowchart that illustrates a process for analyzing whether data should be included in a backup stream, according to one embodiment.

FIG. 7B is a flowchart that illustrates a process for analyzing whether data tagged as important should be included in a backup stream, according to one embodiment. The process begins at 730 by applying a backup scheme to data in a backup stream (or to data in data store 156 if a backup stream has not yet been generated by accelerator 162). At 735, the process analyzes data in the backup stream based on the backup scheme. At 740, the process determines if the data is tagged as important.

If the data is not tagged as important, the process, at 745, gathers additional writes to the same data location on the backup image (e.g., instead of including the data in the backup stream upon the first backup request, backup module 245 can wait for a subsequent backup request before including those storage units in a backup stream to be sent to the backup server). At 750, the process merges small storage units in the backup stream (or in data store 156) into a single span of storage units (e.g., new storage units 225(1-3) as shown in FIG. 4D). The process ends at 755 by sending the merged storage units to the backup server.

Figure 7C:
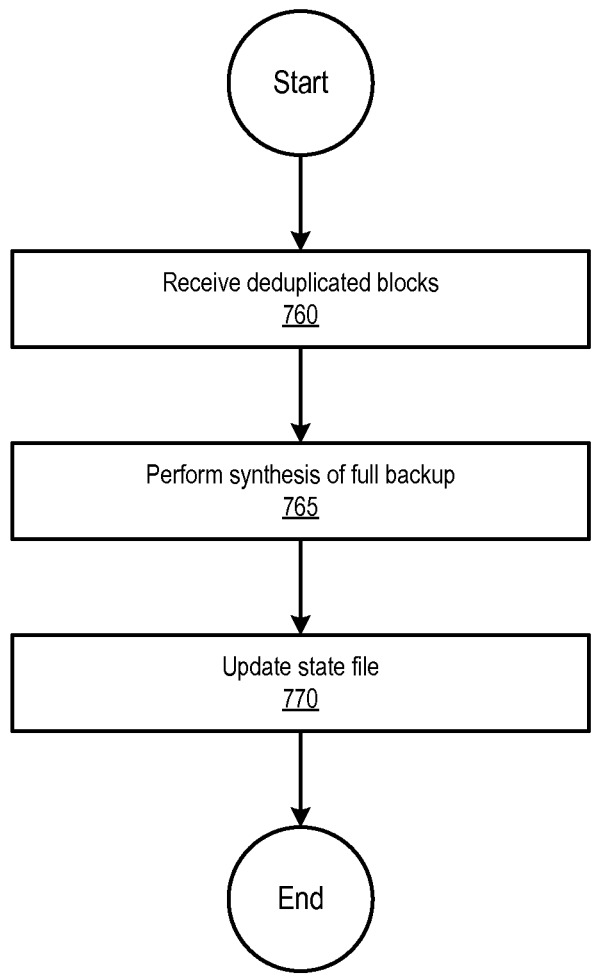
FIG. 7C is a flowchart that illustrates a process for updating a state file, according to one embodiment.

FIG. 7C is a flowchart that illustrates a process for updating a state file upon and creating a synthetic full backup set, according to one embodiment. The process begins at 760 by receiving deduplicated blocks. At 765 the process performs synthesis of a full backup (e.g., a previous full backup set using synthesis engine 182). The process ends at 770 by updating a state file (e.g., state file 174).

Example Computing System

Figure 8:
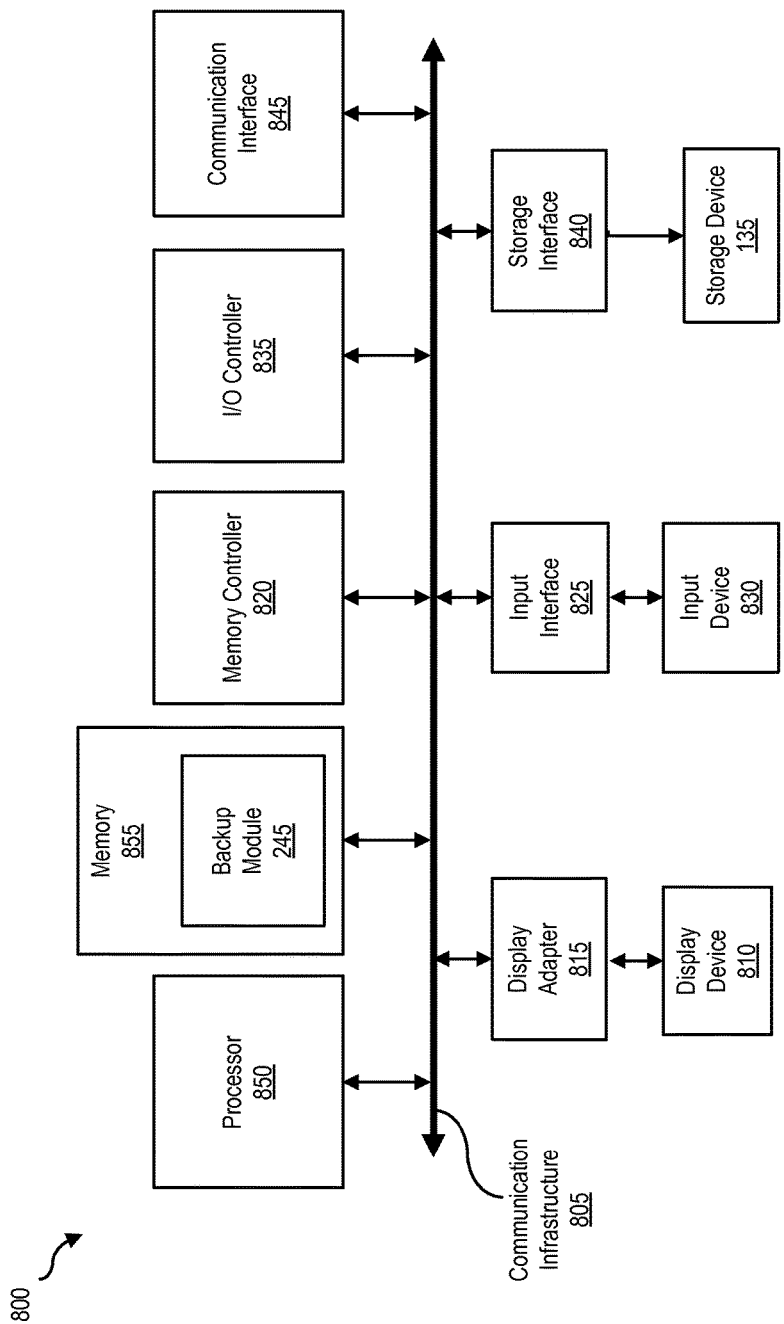
FIG. 8 is a block diagram of a computing device, illustrating how a backup module can be implemented in software, according to one embodiment.

FIG. 8 is a block diagram of a computing system 800 capable of implementing backup server 115 and/or client 105 as described above. Computing system 800 broadly represents any single or multi-processor computing device or system capable of executing computer-readable instructions. Examples of computing system 800 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 800 may include at least one processor 850 and a memory 855. By executing the software that implements backup server 115 and/or client 105, computing system 800 becomes a special purpose computing device that is configured to mitigate fragmentation in synthetic full backups.

Processor 850 generally represents any type or form of processing unit capable of processing data or interpreting and executing instructions. In certain embodiments, processor 850 may receive instructions from a software application or module. These instructions may cause processor 850 to perform the functions of one or more of the embodiments described and/or illustrated herein. For example, processor 850 may perform and/or be a means for performing all or some of the operations described herein. Processor 850 may also perform and/or be a means for performing any other operations, methods, or processes described and/or illustrated herein.

Memory 855 generally represents any type or form of volatile or non-volatile storage device or medium capable of storing data and/or other computer-readable instructions. Examples include, without limitation, random access memory (RAM), read only memory (ROM), flash memory, or any other suitable memory device. Although not required, in certain embodiments computing system 800 may include both a volatile memory unit and a non-volatile storage device. In one example, program instructions implementing a modifiable volume snapshot operation may be loaded into memory 855.

In certain embodiments, computing system 800 may also include one or more components or elements in addition to processor 850 and memory 855. For example, as illustrated in FIG. 8, computing system 800 may include a memory controller 820, an Input/Output (I/O) controller 835, and a communication interface 845, each of which may be interconnected via a communication infrastructure 805. Communication infrastructure 805 generally represents any type or form of infrastructure capable of facilitating communication between one or more components of a computing device. Examples of communication infrastructure 805 include, without limitation, a communication bus (such as an Industry Standard Architecture (ISA), Peripheral Component Interconnect (PCI), PCI express (PCIe), or similar bus) and a network.

Memory controller 820 generally represents any type or form of device capable of handling memory or data or controlling communication between one or more components of computing system 800. For example, in certain embodiments memory controller 820 may control communication between processor 850, memory 855, and I/O controller 835 via communication infrastructure 805. In certain embodiments, memory controller 820 may perform and/or be a means for performing, either alone or in combination with other elements, one or more of the operations or features described and/or illustrated herein.

I/O controller 835 generally represents any type or form of module capable of coordinating and/or controlling the input and output functions of a computing device. For example, in certain embodiments I/O controller 835 may control or facilitate transfer of data between one or more elements of computing system 800, such as processor 850, memory 855, communication interface 845, display adapter 815, input interface 825, and storage interface 840.

Communication interface 845 broadly represents any type or form of communication device or adapter capable of facilitating communication between computing system 800 and one or more additional devices. For example, in certain embodiments communication interface 845 may facilitate communication between computing system 800 and a private or public network including additional computing systems. Examples of communication interface 845 include, without limitation, a wired network interface (such as a network interface card), a wireless network interface (such as a wireless network interface card), a modem, and any other suitable interface. In at least one embodiment, communication interface 845 may provide a direct connection to a remote server via a direct link to a network, such as the Internet. Communication interface 845 may also indirectly provide such a connection through, for example, a local area network (such as an Ethernet network), a personal area network, a telephone or cable network, a cellular telephone connection, a satellite data connection, or any other suitable connection.

In certain embodiments, communication interface 845 may also represent a host adapter configured to facilitate communication between computing system 800 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Serial Advanced Technology Attachment (SATA), Serial Attached SCSI (SAS), and external SATA (eSATA) host adapters, Advanced Technology Attachment (ATA) and Parallel ATA (PATA) host adapters, Fibre Channel interface adapters, Ethernet adapters, or the like. Communication interface 845 may also allow computing system 800 to engage in distributed or remote computing. For example, communication interface 845 may receive instructions from a remote device or send instructions to a remote device for execution.

As illustrated in FIG. 8, computing system 800 may also include at least one display device 810 coupled to communication infrastructure 805 via a display adapter 815. Display device 810 generally represents any type or form of device capable of visually displaying information forwarded by display adapter 815. Similarly, display adapter 815 generally represents any type or form of device configured to forward graphics, text, and other data from communication infrastructure 805 (or from a frame buffer, as known in the art) for display on display device 810.

As illustrated in FIG. 8, computing system 800 may also include at least one input device 830 coupled to communication infrastructure 805 via an input interface 825. Input device 830 generally represents any type or form of input device capable of providing input, either computer or human generated, to computing system 800. Examples of input device 830 include, without limitation, a keyboard, a pointing device, a speech recognition device, or any other input device.

As illustrated in FIG. 8, computing system 800 may also include storage device 135 to communication infrastructure 805 via a storage interface 840. Storage device 135 generally represents any type or form of storage devices or mediums capable of storing data and/or other computer-readable instructions. For example, storage device 135 may include a magnetic disk drive (e.g., a so-called hard drive), a floppy disk drive, a magnetic tape drive, an optical disk drive, a flash drive, or the like. Storage interface 840 generally represents any type or form of interface or device for transferring and/or transmitting data between storage device 135, and other components of computing system 800.

In certain embodiments, storage device 135 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage device 135 may also include other similar structures or devices for allowing computer software, data, or other computer-readable instructions to be loaded into computing system 800. For example, storage device 135 may be configured to read and write software, data, or other computer-readable information. Storage device 135 may also be a part of computing system 800 or may be separate devices accessed through other interface systems.

Many other devices or subsystems may be connected to computing system 800. Conversely, all of the components and devices illustrated in FIG. 8 need not be present to practice the embodiments described and/or illustrated herein. The devices and subsystems referenced above may also be interconnected in different ways from that shown in FIG. 8.

Computing system 800 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 800 for storage in memory via a network such as the Internet or upon a carrier medium.

The computer-readable medium containing the computer program may be loaded into computing system 800. All or a portion of the computer program stored on the computer-readable medium may then be stored in memory 855 and/or various portions of storage device 135. When executed by processor 850, a computer program loaded into computing system 800 may cause processor 850 to perform and/or be a means for performing the functions of one or more of the embodiments described and/or illustrated herein.

Additionally or alternatively, one or more of the embodiments described and/or illustrated herein may be implemented in firmware and/or hardware. For example, computing system 800 may be configured as an application specific integrated circuit (ASIC) adapted to implement one or more of the embodiments disclosed herein.

Example Networking Environment

Figure 9:
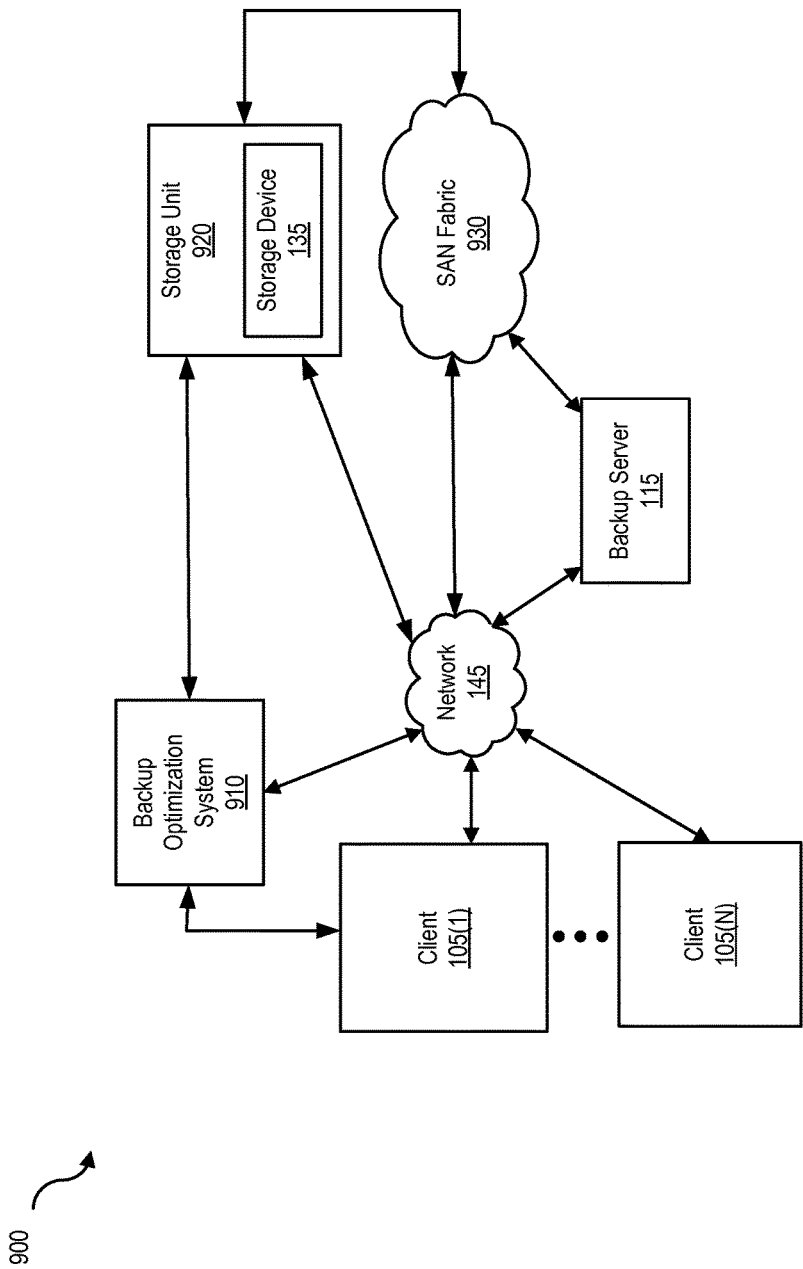
FIG. 9 is a block diagram of a networked system, illustrating how various computing devices can communicate via a network, according to one embodiment.

FIG. 9 is a block diagram of a network architecture 900 in which backup server 115 and/or clients 105(1)-(N) may be coupled to network 145. In certain embodiments, network-attached storage (NAS) devices may be configured to communicate with backup server 115 and/or clients 105(1)-(N) using various protocols, such as Network File System (NFS), Server Message Block (SMB), or Common Internet File System (CIFS).

Network 145 generally represents any type or form of computer network or architecture capable of facilitating communication between multiple computing devices. Network 145 may facilitate communication between backup server 115 and/or clients 105(1)-(N). In certain embodiments, and with reference to computing system 800 of FIG. 8, a communication interface, such as communication interface 845 in FIG. 8, may be used to provide connectivity between backup server 115, clients 105(1)-(N), and network 145. It should be noted that the embodiments described and/or illustrated herein are not limited to the Internet or any particular network-based environment. For example, network 145 can be a Storage Area Network (SAN).

In at least one embodiment, all or a portion of one or more of the embodiments disclosed herein may be encoded as a computer program and loaded onto and executed by backup server 115, clients 105(1)-(N), or any combination thereof. All or a portion of one or more of the embodiments disclosed herein may also be encoded as a computer program, stored in backup server 115 and/or clients 105(1)-(N), and distributed over network 145.

In some examples, all or a portion of the computing devices and/or entities in FIGS. 1A and/or 1B may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In addition, one or more of the components described herein may transform data, physical devices, and/or representations of physical devices from one form to another. For example, backup module 245 and/or metadata module 215 may transform behavior of a backup server and/or client in order to cause the backup server and/or client to mitigate fragmentation in synthetic full backups.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A computer-implemented method of performing a backup operation comprising:
    identifying one or more extents of data among a plurality of extents of data, wherein
        the one or more extents of data are generated by a virtual machine executing on a hypervisor server,
        the identification is performed by a proxy server using a changed block tracker maintained by the hypervisor server, and
        the plurality of extents of data comprise one or more new extents of data or one or more existing extents of data;
    accessing the plurality of extents of data;
    determining whether the one or more extents of data collectively comprise at least a predetermined threshold quantity of data;
    determining whether backing up the one or more extents of data will not exceed a predetermined threshold level of fragmentation;
    in response to determining that the one or more extents of data collectively comprise at least a predetermined threshold quantity of data and that backing up the one or more extents of data will not exceed the predetermined threshold level of fragmentation, generating a backup stream by including, in the backup stream, the one or more extents of data that collectively comprise at least the predetermined threshold quantity of data; and
    sending the backup stream to a backup server as part of the backup operation.

2. The method of claim 1, further comprising:
    obtaining the one or more extents of data from a client; and
    identifying the one or more extents of data obtained from the client using a change tracking log.

3. The method of claim 2, further comprising:
    determining whether the one or more new extents of data meet a new size threshold;
    including the one or more new extents of data that meet the new size threshold in the backup stream;
    determining whether the one or more existing extents of data meet an existing size threshold; and
    including the one or more existing extents of data that meet the existing size threshold in the backup stream.

4. The method of claim 3, further comprising:
    in response to determining that the one or more existing extents of data do not meet the existing size threshold, waiting for the client to generate additional new data prior to including the one or more existing extents of data in the backup stream.

5. The method of claim 4, further comprising:
    in response to determining that the one or more new extents of data do not meet the new size threshold, waiting for the client to generate the additional new data prior to including the one or more new extents of data in the backup stream.

6. The method of claim 1, further comprising:
    determining whether a span of extents of data among the plurality of extents of data comprises more new extents of data than existing extents of data; and
    in response to determining that the span of extents of data comprises more new extents of data than existing extents of data, including the span of extents of data in the backup stream.

7. The method of claim 6, further comprising:
    in response to determining that the plurality of extents of data comprise more new extents of data than existing extents of data, including the span of extents of data in the backup stream.

8. The method of claim 7, further comprising:
    in response to determining that the plurality of extents of data comprise more existing extents of data than new extents of data, limiting a frequency with which the one or more existing extents of data are included in the backup stream.

9. The method of claim 1, further comprising:
    in response to determining that the backup stream is stored by the backup server at a storage location, calculating the predetermined threshold quantity of data, wherein
        the predetermined threshold quantity of data is calculated based, at least in part, by determining whether including the one or more extents of data in the backup stream will cause fragmentation.

10. The method of claim 3, further comprising:
    in response to determining that the one or more new extents of data do not meet the new size threshold, merging two or more new extents of data into a merged extent of data; and
    including the merged extent of data in the backup stream.

11. A system comprising:
    one or more hardware processors; and
    a memory coupled to the one or more hardware processors, wherein the memory stores program instructions executable by the one or more hardware processors to:
        identify one or more extents of data among a plurality of extents of data, wherein
            the one or more extents of data are generated by a virtual machine executing on a hypervisor server,
            identifying the one or more extents is performed by a proxy server using a changed block tracker maintained by the hypervisor server, and
            the plurality of extents of data comprise one or more new extents of data or one or more existing extents of data;
        access the plurality of extents of data;

determine whether the one or more extents of data collectively comprise at least a predetermined threshold quantity of data;

determine whether backing up the one or more extents of data will not exceed a predetermined threshold level of fragmentation;

in response to determining that the one or more extents of data collectively comprise at least a predetermined threshold quantity of data and that backing up the one or more extents of data will not exceed the predetermined threshold level of fragmentation, generate a backup stream by including, in the backup stream, the one or more extents of data that collectively comprise at least the predetermined threshold quantity of data; and send the backup stream to a backup server as part of a backup operation.

12. The system of claim 11, wherein identifying the one or more extents, accessing the plurality of extents of data, determining whether the one or more extends of data collectively comprise at least a predetermined threshold quantity of data, the including, and sending the backup stream is performed by an accelerator, the accelerator is executed on the proxy server, wherein the proxy server is communicatively coupled to the hypervisor server, and the proxy server also comprises a deduplication engine, and the backup server is a media server, wherein
the media server comprises a synthesis engine, a backup engine, and a storage device.

13. The system of claim 12, wherein the one or more extents of data of the plurality of extents of data are generated by a virtual machine executing on the hypervisor server, a metadata module tracks whether the one or more extents of data have changed using a changed block tracker, and the change block tracker is maintained on the hypervisor server.

14. The system of 13, wherein the program instructions are further executable to:

identifying the one or more new extents of data of the plurality of extents of data using the accelerator;

sending the one or more new extents of data from the virtual machine to the proxy server;

retrieving a state file from a master server, wherein
the state file comprises information about each extent of data stored on a virtual disk associated with the virtual machine, and the state file information indicates whether the one or more new extents of data have already been backed up to the storage device as part of a previous full backup operation or as part of a previous incremental backup operation; and in response to determining that the one or more new extents of data or the one or more existing extents of data meet the predetermined threshold quantity of data, including the one or more new extents of data or the one or more existing extents of data in the backup stream.

15. The system of claim 14, wherein the program instructions are further executable to:

sending the backup stream and the state file information to the deduplication engine;

deduplicating the backup stream;

generating, using the synthesis engine, a synthetic full backup on the media server;

updating the state file;

transferring the state file to the master server;

transferring catalog information for the synthetic full backup to the master server to be stored in a catalog, wherein
the catalog comprises location information about the synthetic full backup; and storing the synthetic full backup on the media server.

16. A non-transitory computer readable storage medium comprising program instructions executable to:

identify one or more extents of data among a plurality of extents of data, wherein
the one or more extents of data are generated by a virtual machine executing on a hypervisor server, identifying the one or more extends is performed by a proxy server using a changed block tracker maintained by the hypervisor server, and the plurality of extents of data comprise one or more new extents of data or one or more existing extents of data;

access the plurality of extents of data;

determine whether the one or more extents of data collectively comprise at least a predetermined threshold quantity of data;

determine whether backing up the one or more extents of data will not exceed a predetermined threshold level of fragmentation;

in response to determining that the one or more extents of data collectively comprise at least a predetermined threshold quantity of data and that backing up the one or more extents of data will not exceed the predetermined threshold level of fragmentation, generate a backup stream by including, in the backup stream, the one or more extents of data that collectively comprise at least the predetermined threshold quantity of data; and send the backup stream to a backup server as part of a backup operation.

17. The non-transitory computer readable storage medium of claim 16, comprising:

obtaining the one or more extents of data from a client;

identifying the one or more extents of data obtained from the client using a change tracking log;

determining whether the one or more new extents of data meet a new size threshold;

including the one or more new extents of data that meet the new size threshold in the backup stream;

determining whether the one or more existing extents of data meet an existing size threshold; and including the one or more existing extents of data that meet the existing size threshold in the backup stream.

18. The non-transitory computer readable storage medium of claim 17, further comprising:

in response to determining that the one or more existing extents of data do not meet the existing size threshold, waiting for the client to generate additional new data prior to including the one or more existing extents of data in the backup stream; and in response to determining that the one or more new extents of data do not meet the new size threshold, waiting for the client to generate the additional new data prior to including the one or more new extents of data in the backup stream.

19. The non-transitory computer readable storage medium of claim 16, wherein identifying the one or more extents, accessing the plurality of extents of data, determining whether the one or more extents of data collectively comprise at least a predetermined threshold quantity of data, the including, and sending the backup stream is performed by an accelerator, the accelerator is executed on a proxy server, wherein
   the proxy server is communicatively coupled to a hypervisor server, and
   the proxy server also comprises a deduplication engine,
the backup server is a media server, wherein
   the media server comprises a synthesis engine, a backup engine, and a storage device,
   the one or more extents of data among the plurality of extents of data are generated by a virtual machine executing on the hypervisor server,
   a metadata module tracks whether the one or more extents of data have changed using a changed block tracker, and
   the change block tracker is maintained on the hypervisor server.

20. The non-transitory computer readable storage medium of claim 19, comprising:
   identifying the one or more new extents of data of the plurality of extents of data using the accelerator;
   sending the one or more new extents of data from the virtual machine to the proxy server;
   retrieving a state file from a master server, wherein
      the state file comprises information about each of the extents of data stored on a virtual disk associated with the virtual machine, and
      the state file information indicates whether the one or more new extents of data have already been backed up to the storage device as part of a previous full backup operation or as part of a previous incremental backup operation;
   in response to determining that the one or more new extents of data or the one or more existing extents of data meet the predetermined threshold quantity of data, including the one or more new extents of data or the one or more existing extents of data in the backup stream;
   sending the backup stream and the state file information to the deduplication engine;
   deduplicating the backup stream;
   generating, using the synthesis engine, a synthetic full backup on the media server;
   updating the state file;
   transferring the state file to the master server;
   transferring catalog information for the synthetic full backup to the master server to be stored in a catalog, wherein
      the catalog comprises location information about the synthetic full backup, and
   storing the synthetic full backup on the media server.

* * * * *